(12) United States Patent
Ravi et al.

(10) Patent No.: US 11,410,044 B2
(45) Date of Patent: Aug. 9, 2022

(54) APPLICATION DEVELOPMENT PLATFORM AND SOFTWARE DEVELOPMENT KITS THAT PROVIDE COMPREHENSIVE MACHINE LEARNING SERVICES

(71) Applicant: Google LLC, Mountain View, CA (US)

(72) Inventors: Sujith Ravi, Santa Clara, CA (US); Gaurav Menghani, Santa Clara, CA (US); Prabhu Kaliamoorthi, Mountain View, CA (US); Yicheng Fan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 95 days.

(21) Appl. No.: 16/605,702

(22) PCT Filed: May 21, 2018

(86) PCT No.: PCT/US2018/033674
§ 371 (c)(1),
(2) Date: Oct. 16, 2019

(87) PCT Pub. No.: WO2018/217635
PCT Pub. Date: Nov. 29, 2018

(65) Prior Publication Data
US 2020/0125956 A1    Apr. 23, 2020

Related U.S. Application Data

(60) Provisional application No. 62/667,959, filed on May 7, 2018, provisional application No. 62/517,635, filed (Continued)

(51) Int. Cl.
*G06N 3/08*    (2006.01)
*G06F 8/76*    (2018.01)
(Continued)

(52) U.S. Cl.
CPC .............. *G06N 3/084* (2013.01); *G06F 8/76* (2013.01); *G06F 9/541* (2013.01); *G06K 9/6256* (2013.01)

(58) Field of Classification Search
None
See application file for complete search history.

(56) References Cited

U.S. PATENT DOCUMENTS

2005/0106656 A1    5/2005  Stuiver
2015/0074027 A1    3/2015  Huang et al.
(Continued)

FOREIGN PATENT DOCUMENTS

EP    3144859    3/2017
JP    200991477   3/2002
(Continued)

OTHER PUBLICATIONS

Tang, et al, "Knowledge Transfer Pre-Training", Cornell University Library, Ithaca, New York, Jun. 7, 2015, arxiv.org, XP081345844, 14 pages.
(Continued)

*Primary Examiner* — Chat C Do
*Assistant Examiner* — William C Wood
(74) *Attorney, Agent, or Firm* — Dority & Manning, P.A.

(57) ABSTRACT

The present disclosure provides an application development platform and associated software development kits ("SDKs") that provide comprehensive services for generation, deployment, and management of machine-learned models used by computer applications such as, for example, mobile applications executed by a mobile computing device. In particular, the application development platform and SDKs can provide or otherwise leverage a unified, cross-platform application programming interface ("API") that enables access to all of the different machine learning
(Continued)

services needed for full machine learning functionality within the application. In such fashion, developers can have access to a single SDK for all machine learning services.

18 Claims, 18 Drawing Sheets

Related U.S. Application Data on Jun. 9, 2017, provisional application No. 62/509,058, filed on May 20, 2017.

(51) Int. Cl.
*G06F 9/54* (2006.01)
*G06K 9/62* (2022.01)

(56) References Cited

U.S. PATENT DOCUMENTS

| | | | |
|---|---|---|---|
| 2016/0078339 A1 | 3/2016 | Li et al. | |
| 2016/0321523 A1* | 11/2016 | Sen | G06T 15/06 |
| 2016/0358098 A1 | 12/2016 | Duesterwald et al. | |
| 2017/0124487 A1 | 5/2017 | Szeto et al. | |
| 2017/0132528 A1 | 5/2017 | Aslan et al. | |
| 2017/0140526 A1 | 5/2017 | Chen et al. | |
| 2018/0060722 A1* | 3/2018 | Hwang | G06N 3/0454 |
| 2018/0089591 A1 | 3/2018 | Zeiler et al. | |
| 2018/0160297 A1 | 6/2018 | Geilfuss et al. | |
| 2018/0241848 A1* | 8/2018 | Walls | G06F 9/45558 |
| 2018/0336463 A1 | 11/2018 | Bloom | |
| 2018/0349109 A1 | 12/2018 | Brown et al. | |
| 2019/0086988 A1 | 3/2019 | He et al. | |
| 2019/0114151 A1 | 4/2019 | Jacobs et al. | |
| 2021/0149467 A1 | 5/2021 | El Kaed et al. | |

FOREIGN PATENT DOCUMENTS

| | | |
|---|---|---|
| JP | 201797853 | 6/2017 |
| WO | WO 2005/106656 | 11/2005 |

OTHER PUBLICATIONS

International Search Report and Written Opinion for PCT/US2018/033674 dated Aug. 10, 2018, 15 pages.

Machine Learning Concepts, "TensorFlow Playground", Dec. 11, 2016, https://srirangatarun.wordpress.com/2016/12/11/tensorflow-playground/, retrieved on Oct. 14, 2019, 9 pages.

Machine Think, "Machine Learning on Mobile: on the Device or in the Cloud?" Feb. 16, 2017, https://machinethink.net/blog/machine-learning-device-or-cloud/, retrieved on Oct. 15, 2019, 19 pages.

Gibson et al., "Anticipatory Product Development Using Design Suggestions", Technical Disclosure Commons, Dec. 12, 2017, 34 pages.

Kawasaki, "What We're Seeing with the Appearance of the 'Windows ML' API and the New 'Web View' Supporting AI'", Mar. 13, 2018, https://atmarkit.itmedia.co.jp/ait/articles/1803/13/news033.html, dated Feb. 24, 2022, 23 pages.

* cited by examiner

US 11,410,044 B2

APPLICATION DEVELOPMENT PLATFORM AND SOFTWARE DEVELOPMENT KITS THAT PROVIDE COMPREHENSIVE MACHINE LEARNING SERVICES

PRIORITY CLAIM

The present application is based on and claims the right of priority under 35 U.S.C. § 371 to International Application No. PCT/US2018/033674 filed on May 21, 2018, which claims priority to U.S. Provisional Application 62/509,058 having a filing date of May 20, 2017; U.S. Provisional Application 62/517,635 having a filing date of Jun. 9, 2017; and U.S. Provisional Application 62/667,959 having a filing date of May 7, 2018, which are all incorporated by reference herein.

FIELD

The present disclosure relates generally to systems for developing and managing computer applications. More particularly, the present disclosure relates to an application development platform and associated software development kits ("SDKs") that provide comprehensive services for generation, deployment, and management of machine-learned models used by computer applications such as, for example, mobile applications executed by a mobile computing device.

BACKGROUND

A computer application generally refers to a structured collection of computer-readable instructions that, when executed, cause a computing device to perform certain tasks. The computer application can be stored in a memory of the computing device and executed by one or more processors of the computing device.

Example computer applications include mobile applications and web applications. A mobile application generally refers to a computer application that is specifically designed to be executed primarily by a mobile computing device such as a smartphone, tablet, watch, etc. A web application generally refers to a computer application which is executed in part by a web server and interfaces with a computing device (e.g., a mobile computing device) via the Internet. For example, a user can interface with a web application via a mobile web browser executed by a mobile computing device.

Developers of computer applications (e.g., mobile applications and/or web applications) often rely on the use of software development kits ("SDKs") to develop the application. An SDK can include a set of software development tools that allows the creation of applications for a certain software package, software framework, hardware platform, computer system, operating system, and/or other considerations.

SDKs can often enable the implementation of one or more application programming interfaces ("APIs") in the form of on-device libraries which enable the application to interface with other computing applications or systems that provide various services to the application. Further, as recent advances in machine learning become more integrated with and commonly used by various applications, machine learning services add yet another aspect for application developers to consider and implement.

However, tools and services (e.g., machine learning services) for mobile applications are highly fragmented. For example, analysis has shown that, on average, a typical mobile application uses approximately 16 different SDKs. This fragmented nature of services is costly at runtime, as the application/device must load and execute numerous different libraries, thereby expending significant processing and memory resources. In addition, application developers are required to digest different documentation, download and integrate each SDK separately, call the different methods of each different SDK, learn the respective consoles of each SDK, and other tasks, greatly complicating the development process.

Furthermore, deep neural networks and other complex machine-learned models are being used in countless applications today. However, their accuracy stems in part from having a large number of parameters which incur a high compute overhead. It would be beneficial if these models could be run (and their accuracy benefits received) on mobile and other resource-constrained devices such as smart devices.

While running these models on mobile devices would be great for multiple reasons (e.g., faster interaction between the user and the application, no need for internet connectivity, data does not need to be sent to the cloud, etc.), there are quite a few challenges. In particular, complex models often require significant network bandwidth to transmit, memory resources to store, and processing resources to run. As such, in certain scenarios, complex models may be too large or resource-intensive to run on a resource-constrained device.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1:
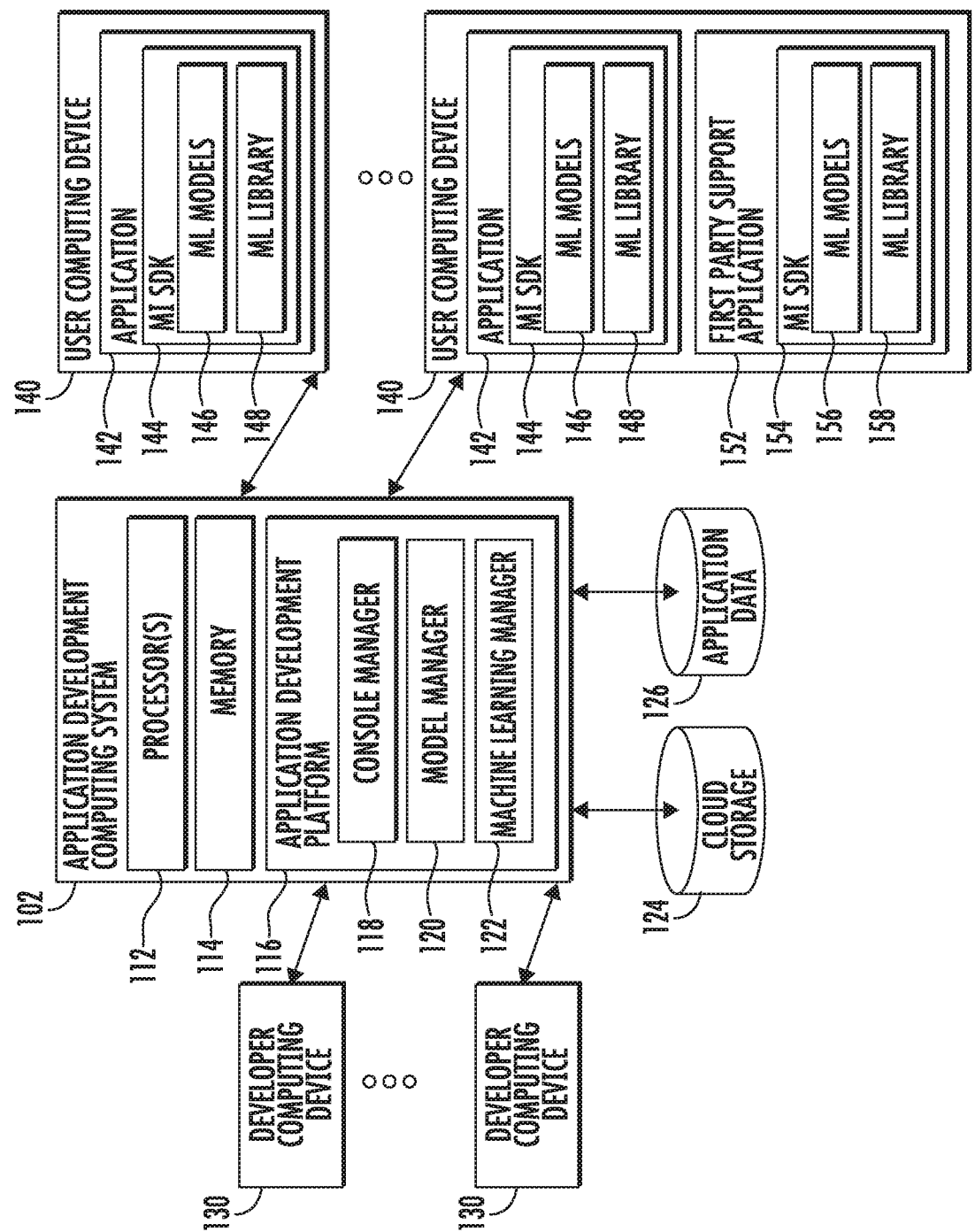
FIG. 1 depicts a block diagram of an example computing system according to example embodiments of the present disclosure.

Generally, the present disclosure is directed to an application development platform and associated software development kits ("SDKs") that provide comprehensive services for generation, deployment, and management of machine-learned models used by computer applications such as, for example, mobile applications executed by a mobile computing device. In particular, the application development platform and SDKs can provide or otherwise leverage a unified, cross-platform application programming interface ("API") that enables access to all of the different machine learning services needed for full machine learning functionality within the application. In such fashion, developers can have access to a single SDK for all machine learning services. Thus, developers will have a single set of docs, a common way of getting machine learning products, a single console to visit, and a single initialization call to serve all of the application's different machine learning needs.

According to one aspect of the present disclosure, the application development platform can enable a developer to generate custom models for their application. In one example, the developer can upload or otherwise provide access to training data and can then use the application development platform to create and train a machine-learned model for use in conjunction with their application. In another example, the developer can upload a pre-trained model to the platform. In yet another example, the developer can select a pre-trained model from a set of available pre-trained models that are made available to the users of the platform. The developer can use the pre-trained model as-is or can retrain the model on additional training data.

Further, after training of the model or, in some implementations, as part of the training process itself, the application development platform can enable the developer to compress and/or convert the models to optimize the models for use by a resource-constrained device (e.g., mobile or embedded device) or in a resource-constrained environment. For example, compressing the model can include performing quantization (e.g., scalar quantization, vector quantization/weight sharing, product quantization, etc.), pruning (e.g., pruning by values, L1 regularization, etc.), low rank representation (e.g., circulent matrix, Kronecker structures, SVD decompositions, etc.), distillation, and/or other compression techniques, including a novel learning technique described further herein that directly learns memory- and compute-efficient (e.g., small-sized and fast) machine-learned models that can be directly used for inference on edge devices such as mobile phones, devices able to be worn, and Internet of Things devices. Thus, various compression tools can optionally be accessed and used to compress a learned or uploaded model.

More particularly, aspects of the present disclosure are directed to an end-to-end compression learning framework that allows compression of an input model (e.g., a large pre-trained model) through a learning process in which a compact model is learned based on the input model. The compact model can be a ready-to-use on-device model that is smaller in size, more memory-efficient, more power-efficient and faster at inference with minimal loss in accuracy. Additional state-of-the-art techniques for compressing machine-learned models can also be used in combination with the compression learning framework.

Converting the model can include converting the model from a standard version into a mobile-optimized version that is compatible with a lightweight machine learning library designed specifically for mobile and embedded devices. In one example, the platform can use a conversion tool known as TensorFlow Lite Optimizing Converter ("TOCO") to convert a standard TensorFlow graph of a model into a TensorFlow Lite graph, where TensorFlow Lite is a lightweight machine learning library designed for mobile applications. Thus, various conversion tools can optionally be accessed and used to convert a learned or uploaded model into a mobile-optimized version.

The compression/conversion service can also provide various tools and dashboards to enable the developer to explore and control compression options. For example, the tools can show tradeoffs with quality, enable parameter tuning, and/or other controls that allow granular control of the compression outcome. For example, the developer can use the compression service to generate multiple models with different sizes and corresponding tradeoffs. These multiple models can be used as part of a model targeting scheme, as described further below.

According to another aspect of the present disclosure, as mentioned above, the present disclosure provides an end-to-end framework and cloud-based solution and API for learning memory- and compute-efficient (i.e., small-sized and fast) machine-learned models that can be directly used for inference on resource-constrained devices. In particular, in some implementations, the end-to-end learning framework can be provided as part or a feature of the application development platform described herein. Thus, the application development platform can employ the end-to-end framework to train a compact machine-learned model that is useful for different problem domains in which a more a complex machine-learned model is typically used.

When the end-to-end learning framework is combined with or provided as a feature of the application development platform, the result is an end-to-end cloud-packaged solution that enables developers to easily train their own high-quality custom on-device models. This enables developers to directly learn models optimized for size and quality using advanced machine learning technology starting from raw training data or their pretrained model checkpoints (if available). However, the end-to-end learning framework can also be used outside the context of or separate from the application development platform. Thus, although the present disclosure focuses on use of the end-to-end framework in the context of the application development platform, the end-to-end framework is not limited to use within such context.

Thus, the end-to-end framework can enable direct learning of compact custom models, which is different from (but optionally complementary to) other techniques (e.g., quantization) which aim to compress model weights post-training or perform model format conversion (e.g., TOCO). The trained compact model can perform in situations involving limited computing power and limited memory for different problem domains that require high computing power and high memory for a complex model. As such, the trained compact machine-learned model can perform prediction tasks on a computing device in situations involving limited computing power and limited memory.

The end-to-end framework can: learn from various input sources; cover a wide range of prediction tasks; support a plurality of use-cases; be powerful in terms of learnable machine-learned models and/or architectures supported; be compatible with infrastructure requirements, such as TensorFlow Lite integration, fast training (e.g., through the use of distributed techniques), access by internal and/or external users (e.g., developers), and platform integration for SDK; and be easily used.

In some implementations, a compact machine-learned model describes a machine-learned model that uses only relatively limited computing power and limited memory, such as a memory- and compute-efficient machine-learned model, or any other suitable machine-learned model with small size and fast computing time. A complex machine-learned model describes a machine-learned model that uses relatively higher computing power and higher memory to predict complex tasks, such as feed-forward neural networks, long short-term memory recurrent neural networks, or other machine-learned models with high computational cost. In some particular scenarios, a complex machined-learned model may be too large or too cumbersome to effectively run on a resource-constrained computing device.

According to one aspect of the present disclosure, the application development platform can be flexible and can enable learning from various inputs and generation of models that predict a wide range of prediction tasks. That is, the end-to-end framework provided by the platform can receive various inputs from a developer and can train a compact model based on and/or which satisfies such inputs.

In some implementations, an input for training the compact machine-learned model can be data, one or more input functions, and/or one or more parameters defining the compact machine-learned model for training the compact machine-learned model. Examples of an input can include labeled data for supervised machine-learned compact model, unlabeled data for compact semi-supervised machine-learned model, pre-trained machine-learned model (which may be used as a trainer model), a desired inference speed, and/or a desired model size.

One example input source is labeled data. For example, the platform can train compact models directly from raw data provided in a format typical for a machine learning library (e.g., tensorflow.Example). The platform can also work with unlabeled data in semi-supervised settings. Another example input source is a pre-trained model. For example, the pre-trained machine-learned model can be larger in size than the compact machine-learned model that will be learned. In one example, the pre-trained model can be a checkpoint from a production model deployed for cloud-based inference.

Inference speed can be a flexible parameter in the input space (e.g., definable by the developer). The inference speed describes a computational efficiency of the compact machine-learned model to run on a wide range of computing devices (e.g., mobile devices, devices able to be worn, embedded devices, etc.). The inference speed can be used to guide a choice of architecture for the compact machine-learned model. The inference speed can depend on compute resources available on a specific device.

Model size can be a flexible parameter in the input space (e.g., definable by the developer). The model size describes a size of the compact machine-learned model after the training process completes. In some implementations, the application development platform can jointly train multiple compact machine-learned models at different sizes (e.g., small: <1-2 million (M), medium: 5-10M, large: >10M) and can make the trained compact machine-learned models available to developers/users so that the users can select a custom-sized model for a particular use-case. In some implementations, the application development platform can train the compact machine-learned model to have a differentiable architecture (e.g., either from a family of efficient architecture skeletons or a set of efficient software operations (ops) such as projections, depth-first convolutions, etc.), rather than pre-specifying a model specification.

In some implementations, the input can further include an indication of the type or class of input. Example types of input include text, image, video, multimodal (text combined with image), sensor signals from a computing device (e.g., the device on which the model will be deployed), or some combination thereof.

In some implementations, the input can further include an indication of the prediction task that will be performed by the trained model. Example prediction tasks performed by the compact machine-learned model (and provided as input) can include a classification (e.g., the number of classes can range from small (e.g., binary or 10-100) to large output spaces (e.g., 10 k or 1M categories)); a regression; or a structured prediction (e.g., sequences).

According to another aspect of the present disclosure, the application development platform can improve prediction accuracy of the compact machine-learned model by jointly training the compact machine-learned model with a trainer model, which may in some instances, be a pre-trained machine-learned model. A pre-trained machine-learned model can be a machine-learned model that is previously trained by the application development platform or by external systems. The pre-trained machine-learned model can be larger in size than the compact machine-learned model, such as a checkpoint from a production model deployed on the cloud. In some implementations, the pre-trained machine-learned model can be a complex model that needs higher computing power and higher memory than the compact machine-learned model.

The joint training enables the compact machine-learned model to learn from (and/or with) the trainer model, thereby improving the prediction accuracy of the compact machine-learned model. Thus, the joint training can follow a teacher-student joint training architecture.

Thus, in some implementations, the application development platform can include and implement a training pipeline to train a compact machine-learned model. The training pipeline can train the compact machine-learned model individually and/or jointly train the compact machine-learned model with a trainer model (e.g., pre-trained model). Thus, the trainer or teacher model can be fixed or can be jointly optimized with the student model.

The trainer or teacher model can be any type of model, including, as examples, feed forward neural networks, recurrent neural networks (e.g., long short-term memory networks), quasi-RNNs, convolutional neural networks, ProjectionNets (e.g., dense and sparse versions), BiLSTM (bi-directional LSTMs), depth-separable ConvNets, MobileNets, ProjectionCNN, NASNets, Inception (e.g., Inception v3), ResNet, and/or other types of machine-learned models. The compact or student model can be any type of model but is typically lighter weight than the trainer model. Example student models include feed forward neural networks, recurrent neural networks (e.g., long short-term memory networks), quasi-RNNs, convolutional neural networks, ProjectionNets (e.g., dense and sparse versions), BiLSTM (bi-directional LSTMs), depth-separable ConvNets, MobileNets, ProjectionCNN, NASNets, Inception (e.g., Inception v3), ResNet, and/or other types of machine-learned models.

In some implementations, the training pipeline can receive one or more inputs from users. For instance, the training pipeline can receive training data along with corresponding input functions for training and input functions for evaluation. The training pipeline can create a schema to specify how one or more trainings for the compact machine-learned model will proceed. The training pipeline can further provide an experiment (e.g., tf.Experiment) based API to construct a network. The training pipeline can invoke the training (e.g., starting the training in a wrapper code and/or training infra).

The training pipeline can train the compact model until a desired number of steps is achieved. The training pipeline can export the trained compact machine-learned model in a specific format (e.g., TF-Lite format). In some implementations, the trained compact machine-learned model can be then used to run on a computing device (e.g., on-device).

In some implementations, the created schema can include several fields, such as experiment name, features (e.g., name of a field, type of a feature, one or more dimensions of a feature, etc.), hyperparameters (e.g., learning rate, number of steps, optimizer, activation layer, loss weight for a pre-trained model, loss weight for the compact model, cross loss weight, etc.), a model specification of the compact model that contains multiple fields to construct the compact model, a model specification of the pre-trained model that contains multiple fields to construct the pre-trained model.

In some implementations, the training pipelines can remove or add fields into a model specification based on ongoing development, and/or new use cases. In some implementations, the training pipeline can validate the schema to make sure that the training pipeline behaves as expected. Before starting the pipeline, each of the fields in the schema is validated. Fields in the model specification can be also validated by a validation method of a respective model class.

In some implementations, the training pipeline can jointly train a compact machine-learned model with a pre-trained machine-learned model. For instance, the training pipeline can receive the pre-trained machine-learned model, the compact machine-learned model, training data, and/or corresponding input functions. The training pipeline can create a schema for specifying how the training will proceed. The training pipeline can provide an experiment-based API to specify the joint training. The training pipeline can invoke joint training.

The training pipeline can jointly train the compact machine-learned model with the pre-trained machine-learned model until a joint training loss function indicates that a difference between an output of the compact machine-learned model and an expected output is less than a threshold value. The training pipeline can extract and export the trained compact machine-learned model in a specific format.

In some implementations, the training pipeline can implement and/or store one or more common machine-learned models (e.g., feed forward networks, projection networks, quasi-recurrent neural networks, convolutional neural network, long short-term memory networks, etc.) for joint training. As such, instead of inputting the pre-trained machine-learned model or a custom compact model specification, users can select a model that is stored and/or implemented in the training pipeline and can input the selection into the training pipeline. In response to the user's selection, the training pipeline can create a schema to specify how the training will proceed with the selected model(s).

In some implementations, the training pipeline can include one or more debugging metrics such as various losses, accuracy, confusion matrices for pre-trained machine-learned models and compact machine-learned models. In some implementations, these added metrics are apart from other metrics (e.g., metrics along with Tensorboard integration). In some implementations, the training pipeline can include example implementations of a wrapper for using tf.Estimator API and other plugins. In some implementations, the training pipelines can include integration with TOCO to export the trained compact machine-learned model to TF-Lite format.

Example uses of compact models generated via the end-to-end framework include: test applications e.g., MNIST, CIFAR10/CIFAR100), smart reply, handwriting recognition, wear health (e.g., heart rate prediction), wear notification (e.g., content-based classification), text classification/ranking, emotion detection, sensitive content detection, gesture recognition, image classification, and/or multimodal learning (e.g., photo reply).

According to another aspect of the present disclosure, the application development platform can enable and perform machine-learned model management. For example, after training, compression, and/or conversion of the model, the developer can use the platform to store the model to a cloud storage database. From the cloud storage database, the developer can use the platform to cause the model to be downloaded to devices that have the developer's application already stored thereon. The platform can also enable the developer to perform various other management functions, including, for example, versioning, compatibility, A/B testing, download management, and/or the like.

Thus, the platform can provide and perform a complete, start-to-finish model generation workflow, which can include the platform: receiving an uploaded model or learning a new model based on uploaded training data; automatically compressing the model with benchmarks; converting the model to a mobile-optimized format; and hosting the model for on-device download and usage.

According to another aspect of the present disclosure, in some implementations, the custom, third party models can be included in a machine intelligence SDK that forms a portion of the application and communicates with the application using a platform API. For example, the machine intelligence SDK can be included in a package of the application that is downloaded from an application marketplace. Thus, the custom models can be downloaded by the device and can run on-device to provide inferences to the application.

Thus, in some implementations, the application development platform can supports so-called "fat" SDKs, where the service runs in the application process. This architecture can provides security and privacy benefits for third party data and models. Alternatively, as will be described further below, the platform can allow exposing via an API existing on-device models that are not included in the application.

Aspects of the present disclosure also enable out-of-band model updating, where an updated version of the model can be downloaded to the machine intelligence SDK on the device without requiring a re-installation of the application as a whole. In other implementations, the models can be downloaded at runtime and inserted into the machine intelligence SDK. Separating download of the models from download of the application as a whole or from download of a more general application update can assist in reducing the size of the application package download or application update download, thereby reducing waiting times and application down time.

According to another aspect, the application development platform can enable the application to leverage first party models that are provided as a feature of the platform. In some implementations, the first party models can be included in the machine intelligence SDK as described above. Alternatively or additionally, the first party models can be included in a first party support application that is separate from the developer's application. In yet other implementations, first and/or third party models can be maintained in the cloud and inferences can be obtained from the models over a network via an API.

Thus, the application development platform can enable an application to access (e.g., to call for inference via an API) both first party models (e.g., general-use models that are provided/maintained by the platform operator) and custom, third party models (e.g., application-specific models that are associated with the specific application developer). In particular, these models can be contained and dynamically updated within a machine intelligence SDK that is included within the application, such that the models provide on-device inference. For example, the first party models can be accessed through the use of a base API while the third party models can be accessed via a custom API.

More particularly, as used herein, the designation "first party" refers to system components (e.g., machine-learned models) that are generally generated, maintained, and/or controlled by the same entity that that operates the platform-at-large. Thus, as a feature of the application development platform, the entity can also provide access to one or more first party models. These first party models can be general-use machine-learned models that provide high quality performance at commonly required tasks such as speech analysis (e.g., natural language processing, voice recognition, and/or the like), text analysis, image analysis (e.g., object detection, barcode/QR code reading, optical character recognition, and/or other tasks which may be categorized as "mobile vision"), and/or the like. Another example first party machine-learned model may be a smart reply model (e.g., accessed via an API) that, in response to an input set of text, predicts possible textual replies with which the user may wish to respond.

In contrast, the designation "third party" refers to system components (e.g., machine-learned models) that are produced by an entity other than the entity that operates the platform-at-large. In one example, third party models may be generated and/or controlled by the application developer. For example, the application developer can use aspects of the platform to generate and deploy their own custom machine-learned models. In another example, third party models may be generated and/or controlled by an additional entity other than the application developer. For example, the application developer can use the application development platform to receive models from such additional entity.

According to another aspect of the present disclosure, the machine intelligence SDK can further include a dedicated machine learning library that can be implemented by the application to run and/or train the models included in the machine intelligence SDK on-device. In some implementations, this machine learning library can be a lightweight library designed for mobile applications (e.g., TensorFlow Lite). Alternatively or additionally, a copy of the same or different machine learning library can also be included in a first party support application. Models included within the first party support application can be run and/or trained on-device by the first party support application using such copy of the machine learning library.

In some implementations, the machine intelligence SDK included within the developer's application and/or the first party application can perform on-device data logging. This on-device logging can support on-device inference and/or training. With respect to on-device training, in some implementations, the machine intelligence SDK can perform validation of training data on-device as part of the logging process. For example, the SDK can detect and exclude anomalies from being logged into the training data. The on-device training can enable personalization of models based on user-specific data. In further implementations, the on-device training can enable participation of the device in a federated learning scheme.

Thus, aspects of the present disclosure are directed to device-wide model training management (e.g. scheduling, storage, etc.). In some implementations, batch training can be performed according to scheduling rules. The scheduling rules can be default and/or customized according to a developer-specified configuration. As one example, training can occur once per day, at night, and when the device is not actively in use, actively being charged, and connected to a network.

The logging can also enable on-device performance monitoring. For example, in some implementations, the machine intelligence SDK can further perform on-device trained model quality validation (e.g., performance monitoring). These quality statistics can be relayed to the developer via a dashboard offered by the application development platform.

In addition or alternatively to on-device inference and/or training, the platform can also enable the application to receive inference and/or training services via the cloud. In one example, the developer may be enabled to specify (e.g., for a subset of devices and/or models) whether inference and/or training occurs on-device or via a cloud service. Both of these options can be supported by a single machine intelligence SDK, providing dynamically-controllable flexibility around the location of inference/training. In some implementations, different APIs or parameters can be used to support each of the two options. In some implementations, the developer can specify rules that handle when inference and/or training should occur on-device or in the cloud and the machine intelligence SDK can implement these rules. For example, use of rules can enable the platform to automatically handle transition/balancing between on-device and cloud services (e.g., to implement a workload balancing scheme). In some implementations, whether inference and/or training occurs on-device or in the cloud can be transparent to the device user.

In addition to dynamic model download and deployment, the application development platform can enable further advanced machine learning services, including, for example, versioning, compatibility, A/B testing, download management, and/or various other management functions. As one example, the application development platform can enable a developer to perform or allow automatic model targeting. For example, different versions of machine-learned models can be distributed to different types of devices. In one example, a larger, more complex model can be distributed to devices with more advanced computing capabilities (e.g., larger memory size, faster processor, etc.) while a smaller, less complex model can be distributed to devices with less advanced computing capabilities. In other examples, different model versions can be downloaded to different devices depending on the geolocation of the device (e.g., English language model for United Kingdom versus French language model for France), characteristics of the user of the device (e.g., paid membership versus free trial), and/or other device and/or user attributes. For example, the developer can specify rules to govern the model targeting and the platform can implement the rules. Thus, the platform can enable an optimal version of a model to be sent (e.g., dynamically downloaded) to each different device.

As another example, the application development platform can provide monitoring of and dashboards that display evaluations of models and system health (i.e., a model evaluation service). For example, the platform can provide analytics on model usage, performance, download status, and/or other measures. Statistics of performance can include descriptions of accuracy, accuracy under curve, precision vs recall, confusion matrix, speed (e.g., #FLOPs, milliseconds per inference), and model size (e.g., before and after compression). The analytics can be used by the developer to make decisions regarding model retraining and compression.

The platform can also provide dashboards that allow the developer to explore system status and health such as model compatibility, availability of stored models, download status, and/or the like. Furthermore, the platform can enable the developer and the devices to ensure (and resolve if needed) backward and forward compatibility of model updates.

As another example, the application development platform can enable a developer to perform A/B experimentation. For example, the developer can enable two models to be used for different traffic or different sets of devices. The platform can collect the resulting data and can provide analytics that enable the developer to explore the performance statistics and outcomes.

The systems and methods of the present disclosure provide a number of technical effects and benefits. As one example technical effect, the application development platform and associated SDKs enable the on-device use of mobile-optimized machine-learned models. These mobile-optimized models provide the following benefits: smaller model size; less memory usage; faster computation; and more efficient power utilization, all with competitive model performance. Further, absent the platform tools described herein which enable easy mobile-optimized model generation and deployment, application developers may choose to perform inference in the cloud. Thus, by enabling on-device usage, the systems and methods of the present disclosure obviate the need for cloud inference calls, thereby reducing network traffic. Further, by enabling on-device training, the systems and methods of the present disclosure can lead to improved model performance including, for example, personalized models and/or models that have been produced through federated learning.

As another example technical effect and benefit, the systems and methods of the present disclosure enable out-of-band model updating, where an updated version of the model can be dynamically downloaded to the machine intelligence SDK on the device without requiring a re-installation of the application as a whole. Separating download of the models from download of the application as a whole or from download of a more general application update can assist in reducing the size of the application package download or application update download, thereby reducing waiting times and application down time. Further, updated models can be distributed in a less intrusive manner and with smaller download sizes.

With reference now to the Figures, example embodiments of the present disclosure will be discussed in further detail.

Example Computing Systems

FIG. 1 depicts a block diagram of an example computing system according to example embodiments of the present disclosure. The example computing system includes developer computing devices 130, an application development computing system 102, and user computing devices 140 in communication over one or more networks.

The developer computing devices 130 can be any type of computing device including, as examples, laptops, smartphones, desktops, server computing devices, etc. The developer computing devices 130 can include one or more processors and a memory. The developer computing devices 130 can be used by application developers to communicate with and/or control an application development platform 116 implemented by the application development computing system 102. As one example, the developer computing device 130 can include a dedicated computer program or application that is designed to communicate with and/or control the application development platform 116. As another example, the developer computing device 130 can include a browser application that communicates with the application development platform 116. For example, the application development platform 116 can provide services to the developer computing device 130 via the browser application.

The application development computing system 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the application development computing system 102 includes or is otherwise implemented by one or more server computing devices. In instances in which the application development computing system 102 includes plural server computing devices, such server computing devices can operate according to sequential computing architectures, parallel computing architectures, or some combination thereof.

The application development computing system 102 provides an application development platform 116. The application development platform 116 can provide comprehensive services for generation, deployment, and management of machine-learned models. The application development platform can include a console manager 118, a model manager 120, and a machine learning manager 122.

The console manager 118 can control and/or manage presentation of a console at the developer computing device 130, including, for example, tasks like presenting a console interface, modifying the console interface, receiving user input directed to the console interface, etc. In some implementations, the console manager 118 can be included in an application stored at the developer computing device 130, or can include portions at both the developer computing device 130 and the application development computing system 102.

The model manager 120 can provide various model management services, including, as examples, a model compression service, a model conversion service, a model evaluation service, model hosting/download management services, and/or other model management services including, for example, versioning, compatibility, and/or A/B testing services.

The machine learning manager 122 can provide a number of machine learning services such as, for example, a model training service and/or a training data management service. The machine learning manager 122 can include and use a machine learning library to train models. Example machine learning libraries include the TensorFlow and TensorFlow Lite libraries.

Each of the console manager 118, model manager 120, and machine learning manager 122 includes computer logic utilized to provide desired functionality. Each of the console manager 118, model manager 120, and machine learning manager 122 can be implemented in hardware, firmware, and/or software controlling a general purpose processor. For example, in some implementations, each of the console manager 118, model manager 120, and machine learning manager 122 includes program files stored on a storage device, loaded into a memory and executed by one or more processors. In other implementations, each of the console manager 118, model manager 120, and machine learning manager 122 includes one or more sets of computer-executable instructions that are stored in a tangible computer-readable storage medium such as RAM hard disk or optical or magnetic media.

The application development platform 116 can be communicatively coupled to one or more databases including, for example, a cloud storage database 124 and/or an application data database 126. The application data database 126 can be a globally-distributed relational and/or non-relational database. The databases 124 and 126 can be one database or can be multiple distributed databases.

The application development platform 116 can also communicate with one or more user computing devices 140. Each user computing device 140 can be any type of computing device including desktop computing devices, server computing devices, mobile computing devices (e.g., smartphones, laptops, tablets, device able to be worn, etc.), embedded devices, smart devices, Internet of Things devices, gaming consoles, computing devices in vehicles, and/or any other form of computing device. Each user computing device 140 can include one or more processors (e.g., as described at 112) and a memory (e.g., as described at 114).

In some implementations, a user computing device 140 can include an application 142. For example, the application 142 can have been developed by a developer associated with a developer computing device (e.g., through use of the application development platform 116). The application 142 can include a machine intelligence SDK 144 that is associated with the application development platform. The machine intelligence SDK 144 can include computer-readable instructions that enable the application 142 to interface with the application development platform 116 and/or other system components (e.g., via the use of one or more platform APIs).

According to aspects of the present disclosure, in some implementations, the machine intelligence SDK 144 can include one or more machine-learned models 146 and a machine learning library 148. For example, the models 146 can have been downloaded (e.g., dynamically and out-of-band) from the cloud storage 124 (e.g., according to instructions received from the model manager 120). The machine intelligence SDK 144 can use the machine learning library 148 to run the machine-learned models 146 to produce inferences for the application 142 on the user computing device 140.

In some implementations, the user computing device 140 can also include a first party support application 152. The first party support application 152 can be a standalone application or can be provided as a portion of the operating system of the user computing device 140.

The first party support application 152 can also include a machine intelligence SDK 154 that is associated with the application development platform. The machine intelligence SDK 144 can include computer-readable instructions that enable the application 152 to interface with the application 142 (e.g., the machine intelligence SDK 144), the application development platform 116, and/or other system components (e.g., via the use of one or more platform APIs).

According to aspects of the present disclosure, in some implementations, the machine intelligence SDK 154 can include one or more machine-learned models 156 and a machine learning library 158. For example, the models 158 can have been downloaded (e.g., dynamically and out-of-band) from the cloud storage 124 (e.g., according to instructions received from the model manager 120). The machine intelligence SDK 154 can use the machine learning library 158 to run the machine-learned models 156 to produce inferences for the application 142 on the user computing device 140.

Figure 2:
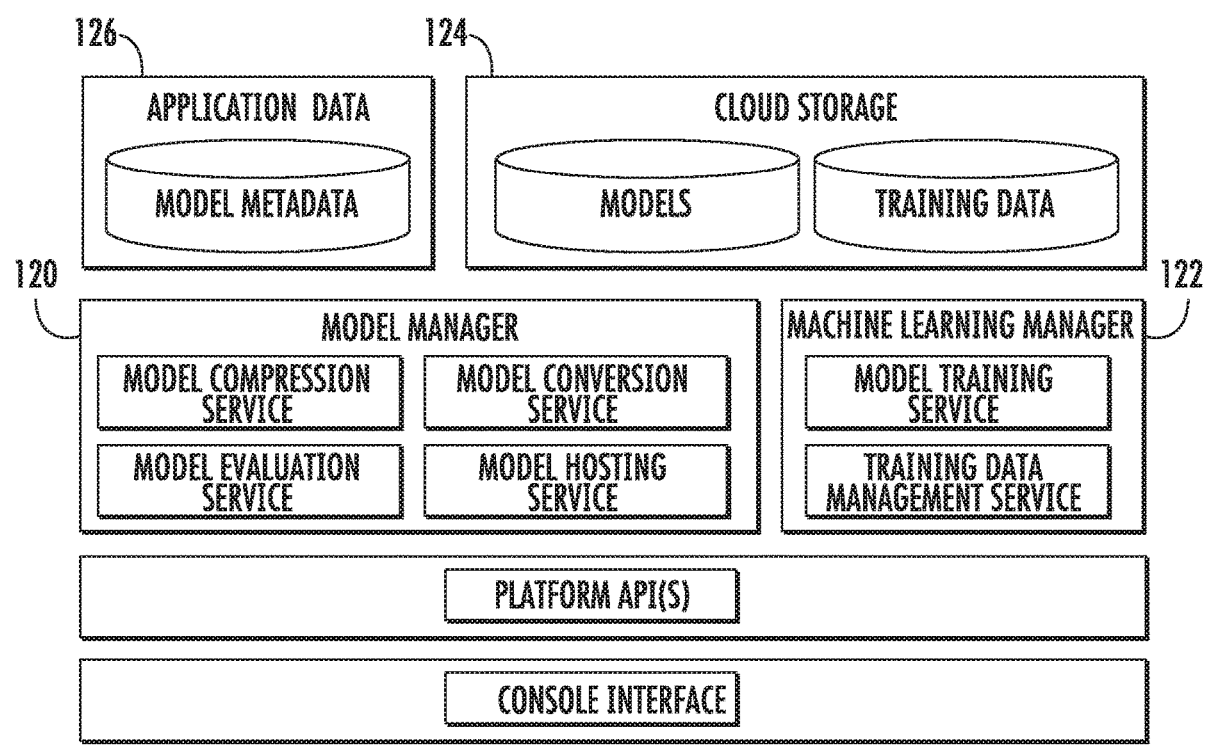
FIG. 2 depicts a stack diagram of an example computing system according to example embodiments of the present disclosure.

FIG. 2 depicts a stack diagram of an example computing system according to example embodiments of the present disclosure. In particular, FIG. 2 illustrates a console interface that communicates/interacts with the model manager 120, machine learning manager 122, cloud storage database 124, and application data database 126 via one or more platform APIs.

As illustrated, the model manager 120 can provide a model compression service, a model conversion service, a model evaluation service and a model hosting service. The model compression service and/or model conversion service can enable the developer to compress and/or convert the models to optimize the models for use by a mobile device or in the mobile environment. For example, compressing the model can include performing quantization (e.g., scalar quantization, vector quantization weight sharing, product quantization, etc.), pruning (e.g., pruning by values, L1 regularization, etc.), low rank representation (e.g., circulatent matrix, Kronecker structures, SVD decompositions, etc.), distillation, and/or other compression techniques.

Pruning reduces model size by removing weights or operations from the model that are least useful for predictions, including, for example, low-scoring weights. This can be very effective especially for on-device models involving sparse inputs. For example, certain on-device conversational models can be pruned further to achieve up-to 2×reduction in size with just 25% lower triggering rate while retaining 97% of the original prediction quality.

Quantization techniques can improve inference speed by reducing the number of bits used for model weights and activations. For example, using 8-bit fixed point representation instead of floats can speed up the model inference, reduce power and reduce size by 4×.

Thus, various compression tools can optionally be accessed and used to compress a learned or uploaded model.

Converting the model can include converting the model from a standard version into a mobile-optimized version that is compatible with a lightweight machine learning library designed specifically for mobile and embedded devices, in one example, the platform can use a conversion tool known as TensorFlow Lite Optimizing Converter ("TOCO") to convert a standard TensorFlow graph of a model into a TensorFlow Lite graph, where TensorFlow Lite is a lightweight machine learning library designed for mobile applications. Thus, various conversion tools can optionally be accessed and used to convert a learned or uploaded model into a mobile-optimized version.

The model evaluation service can provide analytics on model usage, performance (e.g., accuracy, speed, and model size), download status, and/or other measures. The analytics can be used by the developer to make decisions regarding model retraining and compression. The model evaluation service can also provide dashboards that allow the developer to explore system status and health such as model compatibility, availability of stored models, download status, and/or the like. Furthermore, the model evaluation service can enable the developer and the devices to ensure (and resolve if needed) backward and forward compatibility of model updates.

As another example, the model evaluation service can enable a developer to perform A/B experimentation. For example, the developer can enable two models to be used for different traffic or different sets of devices. The platform can collect the resulting data and can provide analytics that enable the developer to explore the performance statistics and outcomes.

The model hosting service can enable models to be downloaded to devices (e.g., devices that have the developer's application stored thereon). The model hosting service can also enable the developer to perform various other management functions, including, for example, versioning, compatibility, download management, model targeting, and/ or the like.

The machine learning manager 122 can provide a training data management service. This service can include a training data flow with comprehensive services including data augmentation, data visualization, data label crowdsourcing, etc. Training data augmentation can include data rotation, perturbation, supplementation (e.g., via image searches), etc.

The machine learning manager 122 can provide a model training service. The model training service can perform training and/or re-training of models. For example, standard training techniques can be used to train models based on training data.

In some implementations, the model training service can perform training techniques provided by the present disclosure that result in learning of compute- or memory-efficient models. In particular, in some implementations, the model training service can perform a novel training scheme that enables direct learning of a compact machine-learned model. For example, the model training service can jointly train the compact machine-learned model with a larger, more complex model in a teacher-student training structure that enables the compact machine-learned model to learn from and approximate the more complex machine-learned model.

In some implementations which employ the schemes described herein Which enable direct learning of compact models, quantization can be applied during training. That is, the model (e.g., network) learns to optimize the weights and activations in the quantized space using gradients computed via backpropagation. This can be more effective than applying this method post training (e.g., quantizing pre-trained weights just for inference).

Some of the joint training and distillation approaches provided by the present disclosure follow a teacher-student setup where the knowledge of the trainer model is utilized to learn an equivalent compact student model with minimal loss in accuracy. During training, the teacher or trainer model parameters can be held fixed (e.g., as in distillation) or jointly optimized to improve both models simultaneously.

In some implementations, the trainer model can also be jointly trained with multiple student models of different sizes. So instead of providing a single compressed model, the machine learning manager 122 can generate multiple on-device models at different sizes and inference speeds and the developer can select the model that is best suited for their application needs (e.g., provides the most appropriate tradeoff between size and performance). Additionally, jointly training multiple compact models with shared parameters typically takes only slightly more time than training a single large model, but yields multiple compressed/compact models in a single shot that are smaller in size, faster, and have lower cost relative to the more complex model, while still providing good prediction accuracy. These techniques can be combined with other techniques like transfer learning to make the learning/compression process more efficient and scalable to large-scale datasets.

More generally, the machine learning manager 122 can include and implement a training pipeline to train a compact machine-learned model. The training pipeline can train the compact machine-learned model individually and/or jointly train the compact machine-learned model with the pre-trained machine-learned model.

In some implementations, the training pipeline can receive one or more inputs from users. For instance, the training pipeline can receive training data along with corresponding input functions for training and input functions for evaluation. The training pipeline can create a schema to specify how one or more trainings for the compact machine-learned model will proceed. The training pipeline can further provide an experiment (e.g., tf.Experiment) based API to construct a network. The training pipeline can invoke the training (e.g., starting the training in a wrapper code and/or training infra).

The training pipeline can train the compact model until a desired number of steps is achieved. The training pipeline can export the trained compact machine-learned model in a specific format (e.g., TF-Lite format). In some implementations, the trained compact machine-learned model can be then used to run on a computing device (e.g., on-device).

In some implementations, the created schema can include several fields, such as experiment name, features (e.g., name of a field, type of a feature, one or more dimensions of a feature, etc.), hyperparameters (e.g., learning rate, number of steps, optimizer, activation layer, loss weight for a pre-trained model, loss weight for the compact model, cross loss weight, etc.), a model specification of the compact model that contains multiple fields to construct the compact model.

In some implementations, the model specification can include some or all of the following example information:
id: A unique identifier for this model instance.
model_type: (e.g., "feed_forward", "projection").
params: A generic dictionary of parameters specific to the model type. For example, projection_size would be a relevant parameter for the projection net, but not for the feedforward nets.
load_checkpoint: If this parameter is set, the model would be loaded from the path which is the value of this parameter.
freeze_model_from_checkpoint: This parameter should only be set to true if load_checkpoint is set. If the value of this parameter is true, gradients would not be backpropagated through this model. This parameter should not be set to true for the pod_model_spec (because it would make no sense to freeze the PoD model, and train the trainer model).
tflite_output_path: If this parameter is set, the pipeline will output this model as a TFLite model (assuming all the ops in the model are supported by TFLite) to the given path.

If both pod_model_spec and trainer_model_spec are defined, then the joint training would proceed. If only pod_model_spec is specified, then the pipeline would train an individual model. Specifying only the trainer_model_spec would be an error.

In some implementations, the training pipeline can remove or add fields into a model specification based on ongoing development, and/or new use cases. In some implementations, the training pipeline can validate the schema to make sure that the training pipeline behaves as expected. Before starting the pipeline, each of the fields in the schema can be validated. Fields in the model specification can be also validated by a validation method of a respective model class.

In some implementations, the training pipeline can implement and/or store one or more common machine-learned models feed forward networks, projection networks, quasi-recurrent neural networks, convolutional neural network, long short-term memory networks, etc.) for joint training. As such, instead of inputting the pre-trained machine-learned model or a custom compact model specification, users can select a model that is stored and/or implemented in the training pipeline and can input the selection into the training pipeline. In response to the user's selection, the training pipeline can create a schema to specify how the training will proceed with the selected model(s).

In some implementations, the training pipeline can include one or more debugging metrics such as various losses, accuracy, confusion matrices for pre-trained machine-learned models and compact machine-learned models. In some implementations, these added metrics are apart from other metrics (e.g., metrics along with Tensorboard integration). In some implementations, the training pipeline can include example implementations of a wrapper for using tf.Estimator API and other plugins. In some implementations, the training pipelines can include integration with TOCO to export the trained compact machine-learned model to TF-Lite format.

Figure 15:
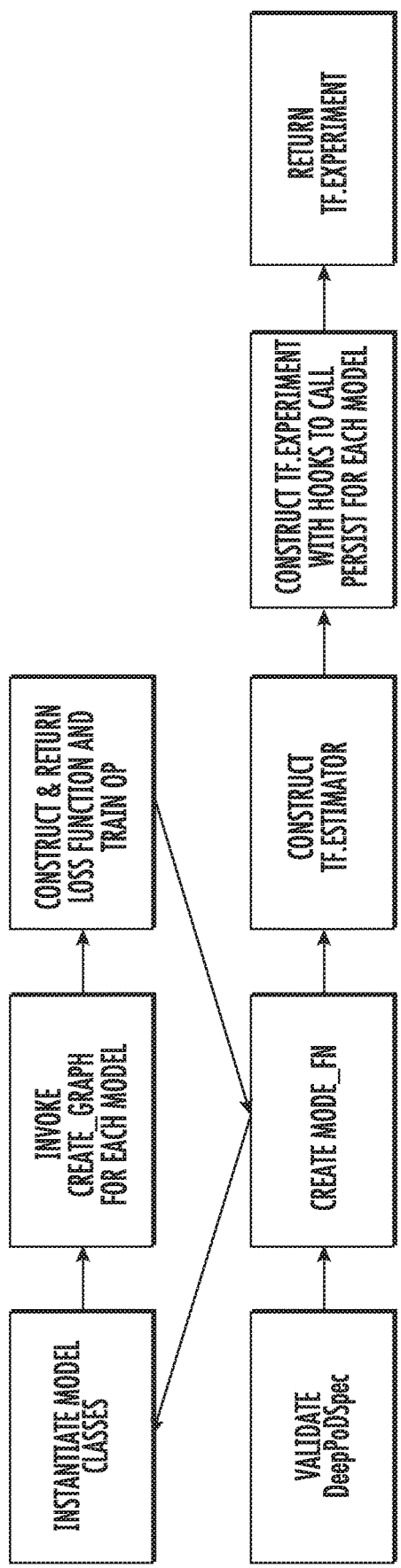
FIG. 15 depicts a workflow diagram for an example training pipeline according to example embodiments of the present disclosure.

As one example, FIG. 15 depicts a workflow diagram for an example training pipeline according to example embodiments of the present disclosure. The training pipeline validates a DeepPodSpec for shared fields between models (e.g., a compact model and a pre-trained model). In some implementations, the training pipeline can invoke a validation method (e.g., respective model-type(s)' validate method) for validating a model specification of a corresponding model and the training pipeline can error out if this validation does not succeed.

The training pipeline can create a model_fn to be used by a tf.Estimator object, which does the follow 1) instantiating respective model classes for each model such that the model performs bookkeeping and sanity checks, 2) invoking the forward_pass method (e.g., create_graph) of each model, 3) constructing and retuning loss function and training operations per predictions from each model and a corresponding specification. The training pipeline constructs the tf.Estimator based on outputs from the model_fn and/or other flags related to the input in the specification.

The training pipeline constructs the tf.Experiment objects with hooks to call persist for each model. The training pipeline returns the tf Experiment object.

The training pipeline can further convert Trainer GraphDef to inference GraphDef. The training pipeline can extract PoD model (if trained jointly) into separate network for inference. The training pipeline can convert frozen inference graph to TF-Lite format.

Figure 16A:
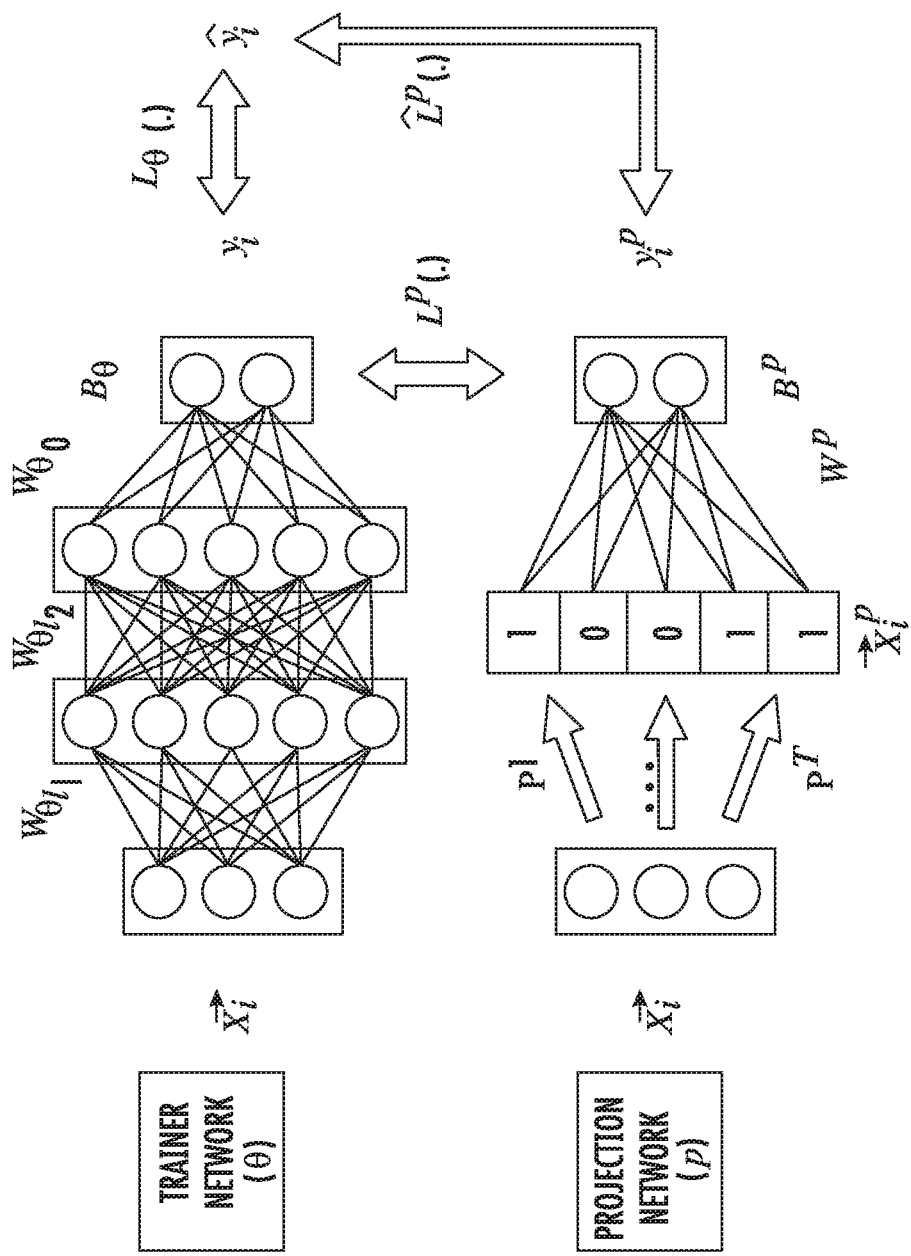
FIG. 16A depicts a graphical diagram of an example joint training scheme according to example embodiments of the present disclosure.

FIG. 16A depicts a graphical diagram of an example joint training scheme according to example embodiments of the present disclosure. In FIG. 16A, a projection network is jointly trained with a trainer network (e.g., feedforward networks, quasi-recurrent neural networks, convolutional neural network, long short-term memory networks, etc.) for learning to mimic predictions made by the trainer network which has far more parameters and hence more predictive capacity. The projection network is provided as one example type of model that can be learned compactly as a student model. Other types of compact models can be jointly learned according to the illustrated training scheme, including, as examples, feed forward neural networks, recurrent neural networks (e.g., long short-term memory networks), quasi-RNNs, convolutional neural networks, ProjectionNets (e.g., dense and sparse versions), BiLSTM (bi-directional LSTMs), depth-separable ConvNets, MobileNets, ProjectionCNN, NASNets, Inception (e.g., Inception v3), ResNet, and/or other types of machine-learned models.

One central aspect of the joint training scheme is a novel objective that jointly trains the two different models—the full trainer model (e.g., using existing architectures like Feed-forward NNs or LSTM RNNs) combined with a simpler student model. For example, the student model can be a projection network that leverages random projections to transform inputs or intermediate representations into bits. Thus, in some implementations, the simpler model can encode lightweight and efficient-to-compute operations in bit space with a low memory footprint.

In some implementations, the two models can be trained jointly using backpropagation, where the student network learns from the teacher network similar to apprenticeship learning. Once trained, the smaller network can be used directly for inference at low memory and computation cost.

The student model can optionally leverage any existing deep network like feed-forward or recursive neural network to teach a lightweight model (e.g., projected model) in a joint optimization setup which is trained end-to-end using backpropagation. In some implementations, projections based on locality sensitive hashing can be used to represent the hidden units for the lightweight network which encodes operations that are extremely efficient to compute during inference.

The framework permits efficient distributed training but can be optimized to produce a neural network model with low memory footprint that can run on devices at low computation cost.

The model size can be parameterized and configurable based on the task or device capacity. The framework is effective in achieving significant reduction in model sizes while providing competitive performance on multiple visual and language classification tasks.

FIG. 16A shows and will be discussed in reference to the framework as applied to train a projection network. However, other model types can be used as the student model other than a projection network.

In some implementations, the trainer network uses $\vec{x}_i$ as an input feature vector to predict a prediction result $y_i$. The projection network uses projection functions ($\mathbb{P}$) to transform the input feature vector $\vec{x}_i$ to projected feature vector $\vec{x}_i^p$. The projection network uses the projected feature vector to predict a prediction result $y_i^p$.

During joint training, a combination of a loss function $\mathcal{L}_\theta(.)$ of the trainer network and a projection loss function $\mathcal{L}^p(.)$ can be optimized such that the projection network can mimic and learn from the trained network. As shown in FIG. 16, a labeled loss $\widetilde{\mathcal{L}}^p(.)$ is also used for the training. The labeled loss $\widetilde{\mathcal{L}}^p(.)$ can be based on a comparison between the prediction result $y_i^p$ and a ground truth $\hat{y}_i$.

Once learning is completed, the transform functions P(.) and corresponding trained weights $W^p$, $B^p$ from the projection network are extracted to create a compact model that can be pushed to device. At inference time, the compact model and corresponding operations can be then applied to a given input $\vec{x}_i$ to generate predictions $y_i^p$.

More particularly, neural networks are a class of non-linear models that learn a mapping from inputs $\vec{x}_i$ to outputs $y_i$, where $\vec{x}_i$ represents an input feature vector or sequence (in the case of recursive neural networks) and $y_i$ is an output category for classification tasks, a predicted sequence, a regression value, etc. Typically, these networks consist of multiple layers of hidden units or neurons with connections between a pair of layers. For example, in a fully-connected feed-forward neural network, the number of weighted connections or network parameters that are trained is $O(n^2)$, where n is the number of hidden units per layer. Other models can similarly receive the inputs and produce the outputs.

The present disclosure provides a new objective and joint optimization framework for training compact on-device models for inference. FIG. 16A illustrates the Neural Projection Network architecture using a feedforward NN for the trainer network. The coupled networks are jointly trained to optimize a combined loss function:

$$\mathcal{L}_{(\theta,p)} = \lambda_1 \cdot \mathcal{L}_\theta(.) + \lambda_2 \cdot \mathcal{L}^p(.) + \lambda_3 \cdot \widetilde{\mathcal{L}}^p(.) \quad \text{Eq. (1)}$$

where $\mathcal{L}_\theta(.)$ $\mathcal{L}^p(.)$ and $\widetilde{\mathcal{L}}^p(.)$ are the loss functions corresponding to the two models as defined below.

$$\mathcal{L}_\theta(.) = \sum_{i \in N} \mathcal{D}(h_\theta(\vec{x}_i), \hat{y}_i) \quad \text{Eqs. (2)}$$

$$\mathcal{L}^p(.) = \sum_{i \in N} \mathcal{D}(h^p(\vec{x}_i), h_\theta(\vec{x}_i))$$

$$\widetilde{\mathcal{L}}^p(.) = \sum_{i \in N} \mathcal{D}(h^p(\vec{x}_i), \hat{y}_i)$$

N indicates the number of training instances in the dataset, $\vec{x}_i$ represents the input feature vector in a feed-forward network or sequence input in an RNN, and $\hat{y}_i$ refers to the ground-truth output classes used for network training. $h_\theta(\vec{x}_i)$ represents a parameterized representation of the hidden units in the trainer network that transforms $\vec{x}_i$ to an output prediction $y_i$. Similarly, $h^p(\vec{x}_i)$ represents the projection network parameters that transforms the input to corresponding predictions $y_i^p$. Softmax activation can be applied at the last layer of both networks to compute the predictions $y_i$ and $y_i^p$.

D denotes a distance function that measures the prediction error used in the loss functions. This can be decomposed into three parts—trainer prediction error, projection simulation error and projection prediction error. Reducing the first leads to a better trainer network and decreasing the latter in turn learns a better projection network that is simpler but with approximately equivalent predictive capacity. In practice, cross-entropy can be used for $\mathcal{D}(.)$. For the projection Lp in Equation 2, a distillation approach can be followed to optimize $\mathcal{D}(.)$ since it has been shown to yield better generalization ability than a model trained on just the labels $\hat{y}_i$, $\lambda_1$, $\lambda_2$, and $\lambda_3$ are hyperparameters that affect the trade-off between these different types of errors. These are tuned on a small heldout development set and, as one example, in experiments were set to $\lambda_1=1.0$, $\lambda_2=0.1$, $\lambda_3=1.0$.

Trainer Network ($\theta$). The trainer model can be a full neural network (feed-forward, RNN or CNN) whose choice can be flexible and depends on the task. FIG. 16A shows a trainer using feed-forward network but this can be swapped with LSTM RNNs or other models such as deep neural networks. For the network shown in the figure, the activations for $h_\theta(.)$ in layer $l_{k+1}$ can be computed as follows:

$$A_{\theta_{l_{k+1}}} = \sigma\left(W_{\theta_{l_{k+1}}} \cdot A_{\theta_{l_k}} + B_{\theta_{l_{k+1}}}\right) \quad \text{Eq. (3)}$$

where $\sigma$ is the ReLU activation function applied at each layer except the last and A indicates the computed activation values for hidden units.

The number of weights/bias parameters $W_\theta$, $B_\theta$ in this network can be arbitrarily large since this will only be used during the training stage which can be effectively done using high-performance distributed computing with CPUs or GPUs.

Projection Network (p). The projection model is a simple network that encodes a set of efficient to-compute operations which will be performed directly on device for inference. The model itself defines a set of efficient "projection" functions $\mathbb{P}(\vec{x}_i)$ that project each input instance $\vec{x}_i$ to a different space $\Omega_\mathbb{P}$ and then performs learning in this space to map it to corresponding outputs $y_i^p$. A simplified projection network with few operations is used as illustrated in FIG. 16A. One example projection network is shown. Other structures can be used as well (e.g., additional layers, etc.)

The inputs $\vec{x}_i$ are transformed using a series of T projection functions $\mathbb{P}^1, \ldots, \mathbb{P}^T$, which can be then followed by a single layer of activations.

$$x_i^P = \mathbb{P}^1(\vec{x}_i), \ldots, \mathbb{P}^T(\vec{x}_i) \qquad \text{Eq. (4)}$$

$$y_i^P = \text{softmax}(W^P \cdot \vec{x}_i^P + B^P) \qquad \text{Eq. (5)}$$

The projection transformations use pre-computed parameterized functions, i.e., they are not trained during the learning process, and their outputs are concatenated to form the hidden units for subsequent operations. During training, the simpler projection network learns to choose and apply specific projection operations $\mathbb{P}^i$ (via activations) that are more predictive for a given task. It is possible to stack additional layers connected to the bit-layer in this network to achieve non-linear combinations of projections.

The projection model can be jointly trained with the trainer and learns to mimic predictions made by the full trainer network which has far more parameters and hence more predictive capacity. Once learning is completed, the transform functions $\mathbb{P}(.)$ and corresponding trained weights $W^P$, $B^P$ from the projection network are extracted to create a lightweight model that can be pushed to device. At inference time, the lightweight model and corresponding operations can be then applied to a given input $\vec{x}_i$ to generate predictions $y_i^P$.

The choice of the type of projection matrix $\mathbb{P}$ as well as representation of the projected space $\Omega_\mathbb{P}$ in the setup has a direct effect on the computation cost and model size. An efficient randomized projection method is leveraged using a modified version of locality sensitive hashing (LSH) to define $\mathbb{P}(.)$. In conjunction, a bit representation $1^d$ is used for $\Omega_\mathbb{P}$, i.e., the network's hidden units themselves are represented using projected bit vectors. This yields a drastically lower memory footprint compared to the full network both in terms of number and size of parameters. A few key properties of this approach include:

There is no requirement for committing to a preset vocabulary or feature space unlike typical machine learning methods which resort to smaller vocabulary sizes as a scaling mechanism. For example, LSTM RNN models typically apply pruning and use smaller, fixed-size vocabularies in the input encoding step to reduce model complexity.

The proposed learning method scales efficiently to large data sizes and high dimensional spaces. This is especially useful for natural language applications involving sparse high dimensional feature spaces. For dense feature spaces (e.g., image pixels), existing operations like fully-connected layers (or even convolutions) can be efficiently approximated for prediction without relying on a large number of parameters. Such operations can also be applied in conjunction with the projection functions to yield more complex projection networks while constraining the memory requirements.

Computation of $\mathbb{P}(x_i)$ can be independent of the training data size.

It can be ensured that $\mathbb{P}(.)$ can be efficient to compute on-the-fly for inference on device.

Next, the present disclosure describes the projection method and associated operations in more detail.

Locality Sensitive Projection Network: The projection network described earlier relies on a set of transformation functions $\mathbb{P}$ that project the input $\vec{x}_i$ into hidden unit representations $\Omega_\mathbb{P}$. The projection operations outlined in Equation 4 can be performed using different types of functions.

One possibility is to use feature embedding matrices pre-trained using word2vec or similar techniques and model $\mathbb{P}$ as an embedding lookup for features in $\vec{x}_i$ followed by an aggregation operation such as vector averaging. However, this requires storing the embedding matrices which incurs additional memory complexity.

Instead, an efficient randomized projection method can be employed for this step. Locality sensitive hashing (LSH) can be used to model the underlying projection operations, LSH is typically used as a dimensionality reduction technique for applications like clustering. A motivation for using LSH within Projection Nets is that it allows one to project similar inputs $\vec{x}_i$ or intermediate network layers into hidden unit vectors that are nearby in metric space. This allows transformation of the inputs and learning of an efficient and compact network representation that is only dependent on the inherent dimensionality (i.e., observed features) of the data rather than the number of instances or the dimensionality of the actual data vector (i.e., overall feature or vocabulary size). This can be achieved with binary hash functions for $\mathbb{P}$.

Theorem 1: For $\vec{x}_i, \vec{x}_j \in \mathbb{R}^n$ and vectors $\mathbb{P}_k$ drawn from a spherically symmetric distribution on $\mathbb{R}^n$ the relation between signs of inner products and the angle $\measuredangle(\vec{x}_i, \vec{x}_j)$ between vectors can be expressed as follows:

$$\measuredangle(\vec{x}_i, \vec{x}_j) = \pi Pr\{\text{sgn}[\langle \vec{x}_i, \mathbb{P}_k \rangle] \neq \text{sgn}[\langle \vec{x}_j, \mathbb{P}_k \rangle]\} \qquad \text{Eq. (6)}$$

This property holds from simple geometry, i.e., whenever a row vector from the projection matrix $\mathbb{P}$ falls inside the angle between the unit vectors in the directions of $\vec{x}_i$ and $\vec{x}_j$, they will result in opposite signs. Any projection vector that is orthogonal to the plane containing $\vec{x}_i$ $\vec{x}_j$ will not have an effect. Since inner products can be used to determine parameter representations that are nearby, $\langle \vec{x}_i, \vec{x}_j \rangle = \|x_i\| \cdot \|x_j\| \cdot \cos \measuredangle(\vec{x}_i, \vec{x}_j)$, therefore the network hidden activation unit vectors can be modeled and stored in an efficient manner by using the signature of a vector in terms of its signs.

Computing Projections: Following the above property, binary hashing can be used repeatedly and the projection vectors in $\mathbb{P}$ can be applied to transform the input $\vec{x}_i$ to a binary hash representation denoted by $\mathbb{P}_k(\vec{x}_i) \in \{0,1\}^d$, where $[\mathbb{P}_k(\vec{x}_i)] := \text{sgn}[\langle \vec{x}_i, \mathbb{P}_k \rangle]$. This results in a d-bit vector representation, one bit corresponding to each projection row $\mathbb{P}_{k=1 \ldots d}$.

The projection matrix $\mathbb{P}$ can be fixed prior to training and inference. Note explicit storage of the random projection vector $\mathbb{P}_k$ is not needed since they can be computed on the fly using hash functions rather than invoking a random number generator. In addition, this also permits performance of projection operations that are linear in the observed feature size rather than the overall feature size which can be prohibitively large for high-dimensional data, thereby saving both memory and computation cost. The binary representation can be significant since this results in a significantly compact representation for the projection network parameters that in turn reduces the model size considerably compared to the trainer network.

Note that other techniques like quantization or weight sharing can be stacked on top of this method to provide further gains in terms of memory reduction.

Projection Parameters: In practice, T different projection functions $\mathbb{P}^{j=1\cdots T}$ can be employed as shown in FIG. 16A, each resulting in d-bit vector that can be concatenated to form the projected activation units $\vec{x}_i^p$ in Equation 4. T and d vary depending on the projection network parameter configuration specified for $\mathbb{P}$ and can be tuned to trade-off between prediction quality and model size.

Training and Inference: The compact bit units can be used to represent the projection network as described earlier. During training, this network learns to move the gradients for points that are nearby to each other in the projected bit space $\Omega_{\mathbb{P}}$ in the same direction. The direction and magnitude of the gradient can be determined by the trainer network which has access to a larger set of parameters and more complex architecture.

The two networks are trained jointly using backpropagation. Despite the joint optimization objective, training can progress efficiently with stochastic gradient descent with distributed computing on high-performance CPUs or GPUs.

Once trained, the two networks are de-coupled and serve different purposes. The trainer model can be deployed anywhere a standard model can be used. The simpler projection network model weights along with transform functions $\mathbb{P}(.)$ are extracted to create a lightweight model that can be pushed to device. This model is used directly "on" device at inference time by applying the same operations in Equations 4, 5 to a new input $\vec{x}_i$ and generate predictions $y_i^p$.

As an alternative to the bit vector representation $\Omega_{\mathbb{P}}$, the projection matrix $\mathbb{P}$ can instead be used to generate a sparse representation of hidden units in the projection network. Each d-bit block can be encoded as an integer instead of a bit vector. This results in a larger parameter space overall $O(T \cdot 2^d)$ but can still be beneficial to applications where the actual number of learned parameters can be tiny and inference can be performed via efficient sparse lookup operations.

Any compact machine-learned model can be jointly trained with any trainer model, including, for example, a pre-trained machine-learned model.

Figure 16B:
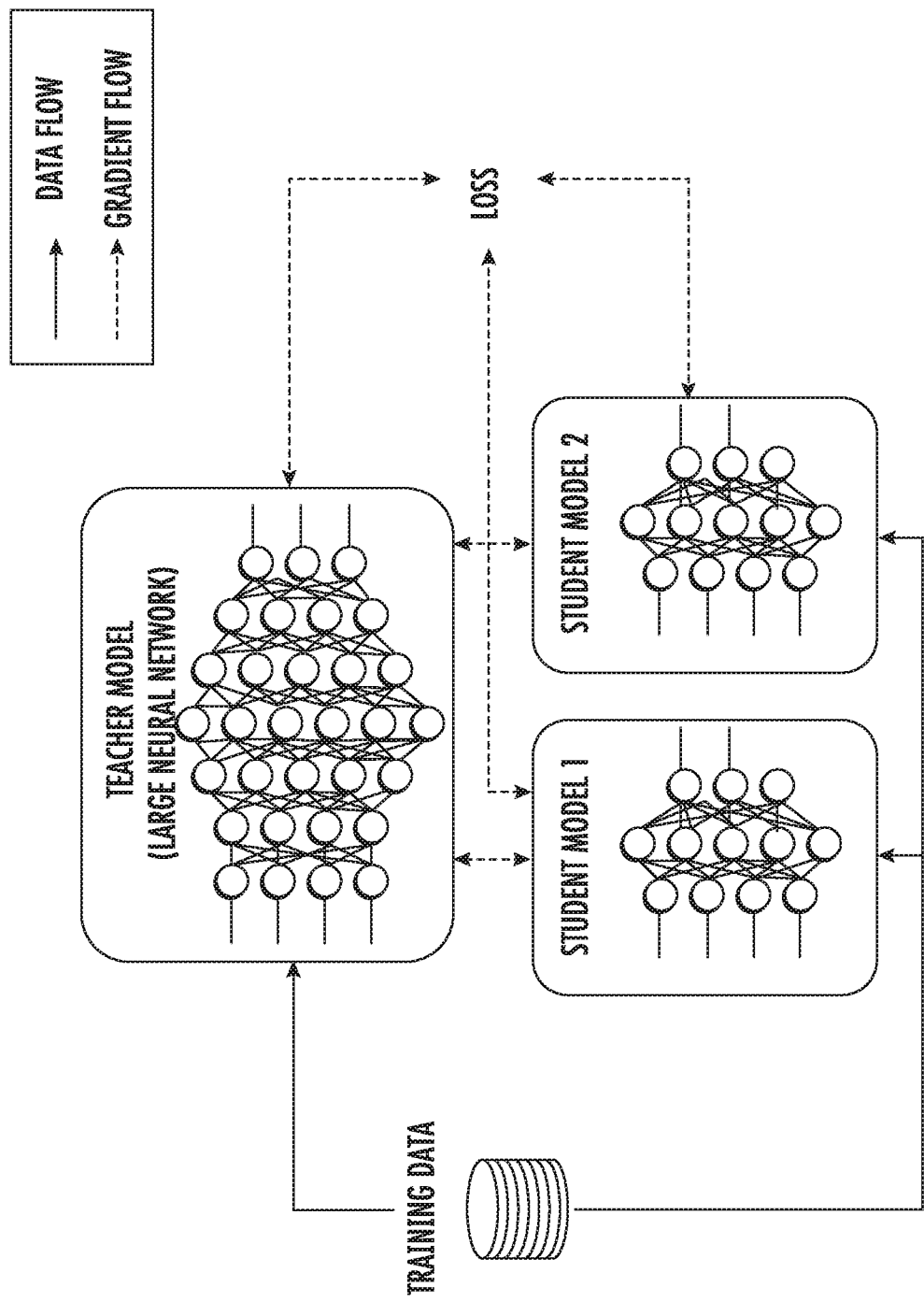
FIG. 16B depicts a graphical diagram of the example joint training scheme used to train multiple student models according to example aspects of the present disclosure.

In some implementations, the trainer model can also be jointly trained with multiple student models of different sizes. As an example, FIG. 16B depicts a graphical diagram of the example joint training scheme used to train multiple student models according to example aspects of the present disclosure. The multiple student models can be The compression learning framework described herein has been used in example experimental tests to successfully generate small and fast models with good prediction accuracy suited for mobile applications. For example, on ImageNet task, the compression learning framework was able to generate a model 22× smaller than Inception v3 baseline and 4× smaller than MobileNet v1 baseline with just 4.6-7% drop in accuracy. As another example, on CIFAR-10, jointly training multiple models with shared parameters as described herein, takes only 10% more time than training a single large model, but yields 3 compressed models that are up to 94× smaller in size and up to 27× faster with up to 36× lower cost and good prediction quality (90-95% top-1 accuracy).

Figure 17:
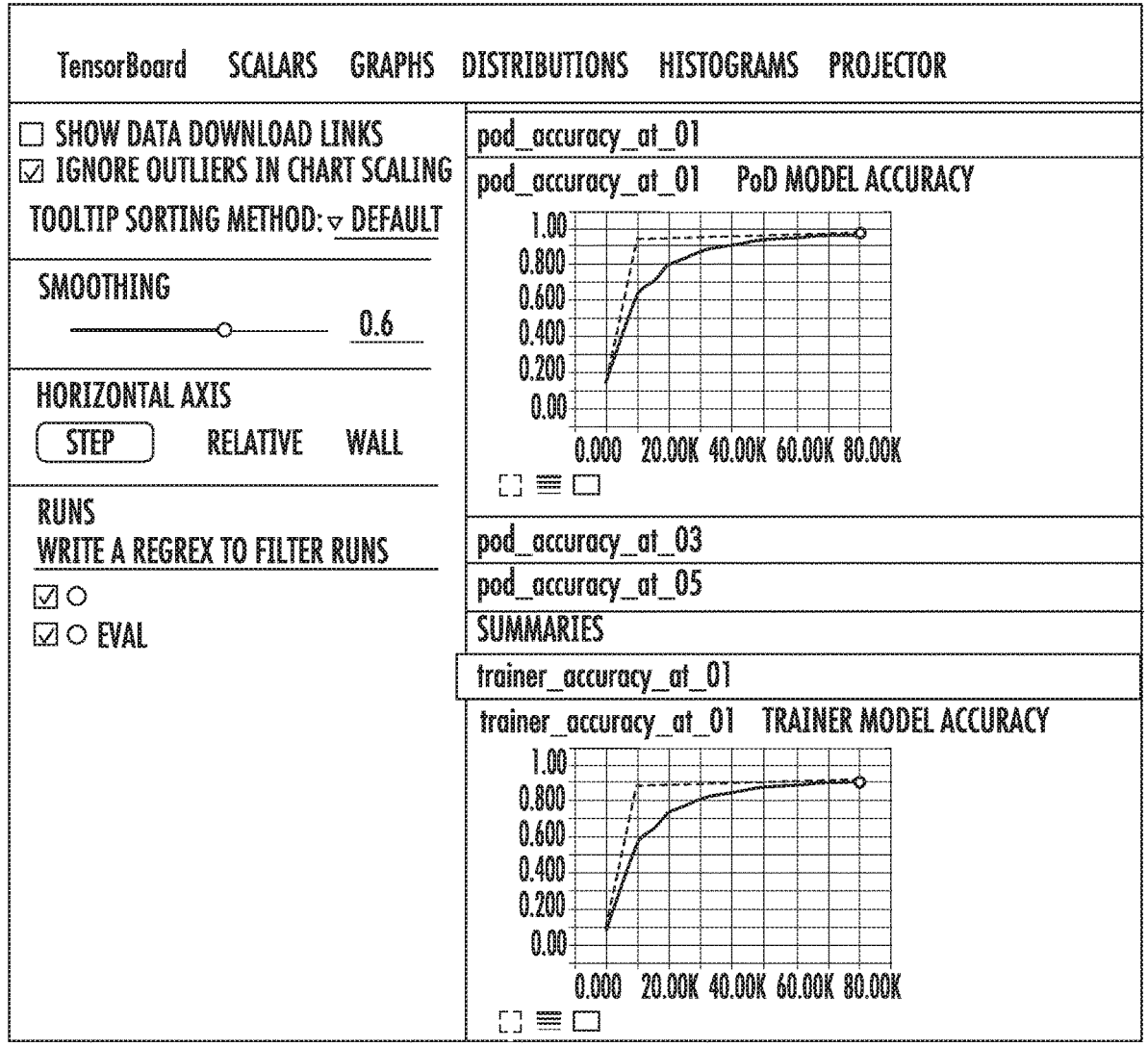
FIG. 17 depicts an example user interface according to example embodiments of the present disclosure.

FIG. 17 depicts an example user interface according to example embodiments of the present disclosure. The user interface can be referred to as a Tensorboard. Once the training starts, users can monitor a training progress on Tensorboard. The Tensorboard has several options (e.g., scalars, graphs, distributions, histograms, and projectors) to present the training progress.

As shown in FIG. 17. "SCALARS" option can be selected to present compact model (also referred to PoD model) accuracy and trainer model accuracy. Several tools to process charts on the right of the user interface are shown on the left of the user interface, such as "Show data download links" to show download links of data associated with the PoD model and/or the trainer model, "Ignore outliers in chart scaling" to remove outliers in the charts on the right of the user interface, "Tooltip sorting method" to allow users to select a method for sorting, "Smoothing" to allow users to select a smoothing level to smooth accuracy curves on the right of the user interface, "Horizontal Axis" to allow users to select a type (e.g., running steps, relative, and wall) of the horizontal of the accuracy curves, and "Runs" to write a regex to filter runs.

Figure 18:
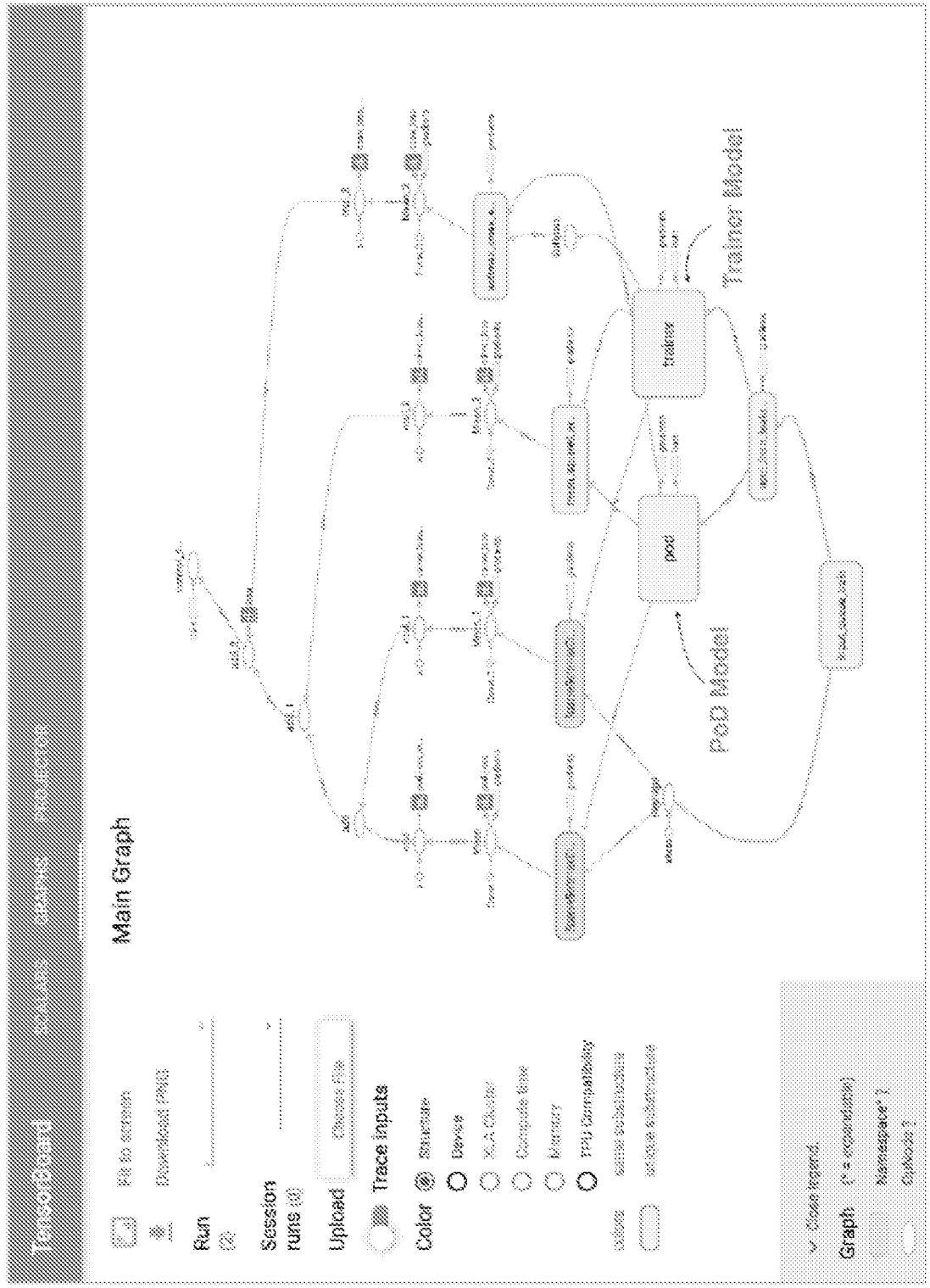
FIG. 18 depicts an example user interface according to example embodiments of the present disclosure.

FIG. 18 depicts an example user interface according to example embodiments of the present disclosure. As shown in FIG. 18, "GRAPHS" option is selected. A graph on the right of the user interface shows an example structure of the training. The structure shows how the joint training of the PoD model and trainer can be performed. The structure shows a dataflow from the bottom to the top and shows each function that can be used to jointly train the PoD model and the trainer. Several tools are listed on the left of the user interface. Users can select the tools to process the graph on the right of the user interface. For example, input can be traced by activating "Trace input."

Referring again to FIG. 2, the application data database 126 can store model metadata. The cloud storage database 124 can store machine-leaned models (including both third party models and first party models) and training data. The training data can be uploaded by developers and can include validation data. Alternatively or additionally, the training data can be derived from large, public training datasets.

As illustrated, the console interface can communicate/interact with the model manager 120, machine learning manager 122, cloud storage database 124, and application data database 126 via one or more platform APIs. Example APIs are provided in the attached appendices. These APIs are provided as examples only. Different APIs can be used in addition or alternatively to the example APIs.

Appendix A provides example custom model APIs. Appendix A is incorporated into and forms a part of this specification.

Appendix B provides example vision model APIs. Appendix B is incorporated into and forms a part of this specification.

Appendix C provides example vision model APIs. Appendix C is incorporated into and forms a part of this specification.

Figure 3:
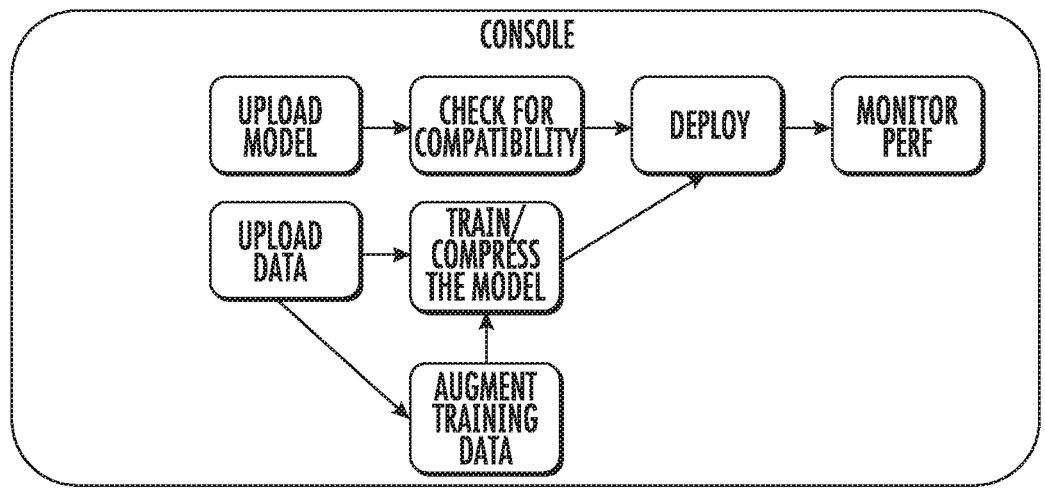
FIG. 3 depicts a functional diagram of an example console according to example embodiments of the present disclosure.

Referring now to FIG. 3, FIG. 3 depicts a functional diagram of example console interface modes/states according to example embodiments of the present disclosure. As illustrated, in one workflow, a developer can progress through various console interfaces which respectively enable the developer to upload a model, check for compatibility, deploy the model, and then monitor performance of the model. In another workflow, the console can provide interfaces that respectively upload training data (e.g., to cloud storage buckets), optionally augment the training data, train and/or compress the model, and then deploy the model and monitor performance.

In some implementations, the console can provide a number of tools or user interfaces that assist the developer in generating the correct machine-learned model. As one example, the console can provide a set of use cases for developers to choose from, which will determine the target model architecture. In another example, the console can enable the developer to select or explore accuracy vs model size trade-off requirements.

Figure 4:
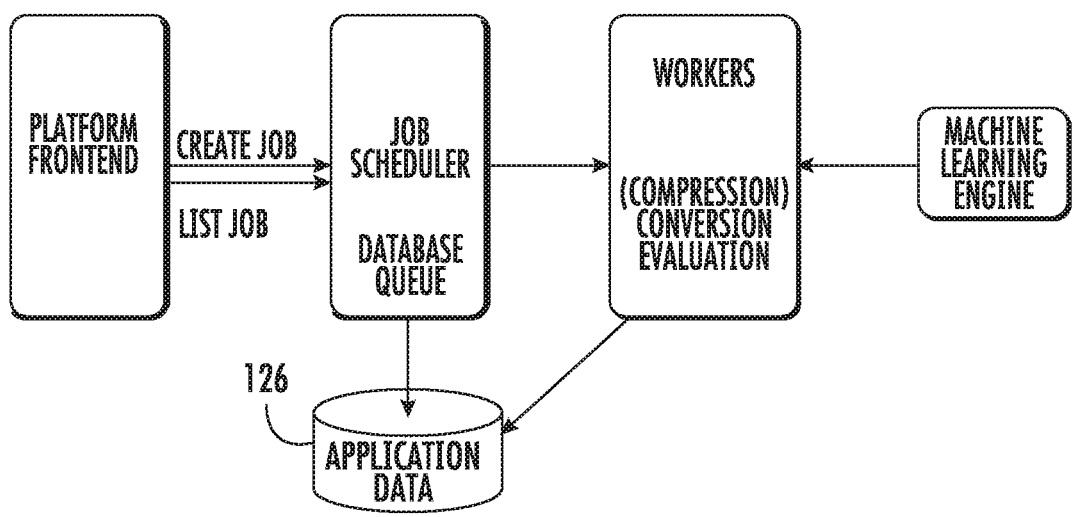
FIG. 4 depicts a workflow diagram of an example computing system according to example embodiments of the present disclosure.

FIG. 4 depicts a workflow diagram of an example computing system according to example embodiments of the present disclosure. More particularly, in some implementations, since model compression and/or conversion are long running tasks, they are not handled within the frontend server directly. In such cases, dedicated backend jobs are used to do the processing. FIG. 4 shows one example arrangement of such a system that includes a job scheduler with database queue to handle the job scheduling between the frontend and the backend.

In the backend job, the developer-provided model may need to be run. As a result, the process that runs the service can be sandboxed to provide privacy and security. For example, a cloud machine learning engine can be used.

In some implementations, at a high level, the platform can treat both model compression and conversion as a job. Thus, in some implementations, when a developer wants a model to be compressed or converted, the platform frontend server can create a job and insert it to database queue. The scheduler can handle the actual job scheduling, while the platform frontend server will keep on polling the status of the job, and report it back to the developer when it enters terminal state. The developer can also initiate the query to check the status of their jobs.

Figure 5:
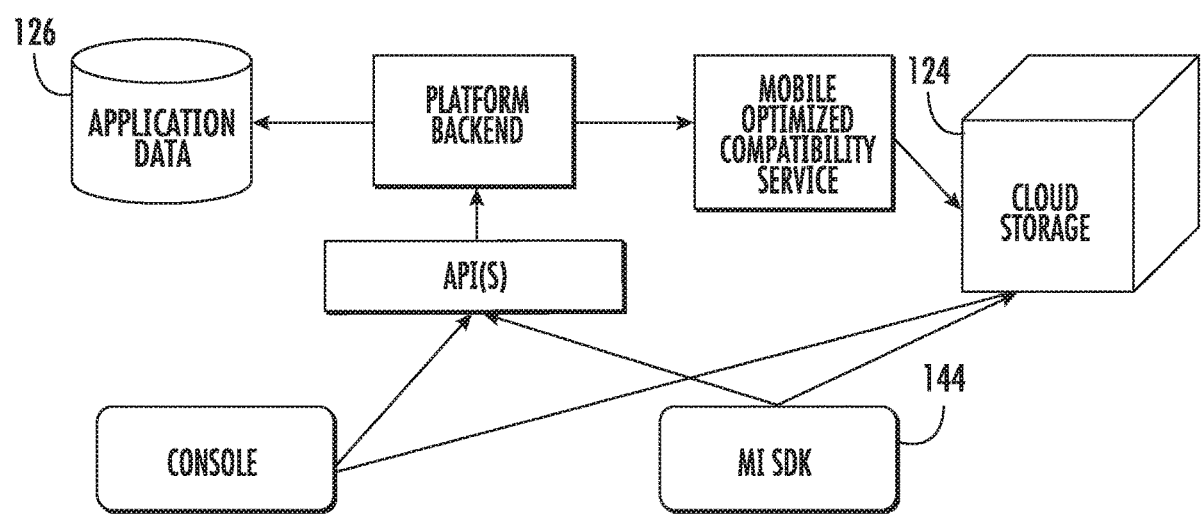
FIG. 5 depicts a workflow diagram of an example computing system according to example embodiments of the present disclosure.

FIG. 5 depicts a workflow diagram of an example computing system according to example embodiments of the present disclosure. In particular, FIG. 5 depicts an example of a basic device-side flow. In particular, the application development platform and machine intelligence SDK allow developers to use custom models on the device. The API allows the application to perform inference using a custom model that's already on the device, where the developer either manually downloads the model file from somewhere or packages it within the application itself.

The platform also provides a model file hosting solution that is tightly integrated with the client-side SDK, which will provide the following features: A user interface part of platform console where the developer can manage their models; Model versioning, allowing the developer to specify active (or production) model and/or easily perform rollbacks Automatically determining uploaded model compatibility with different machine learning library versions and only serving compatible models to compatible devices; and/or First class A/B testing support, allowing the developer to run experiments on different versions of their model.

Example Model Generation and Deployment Workflows

Figure 6:
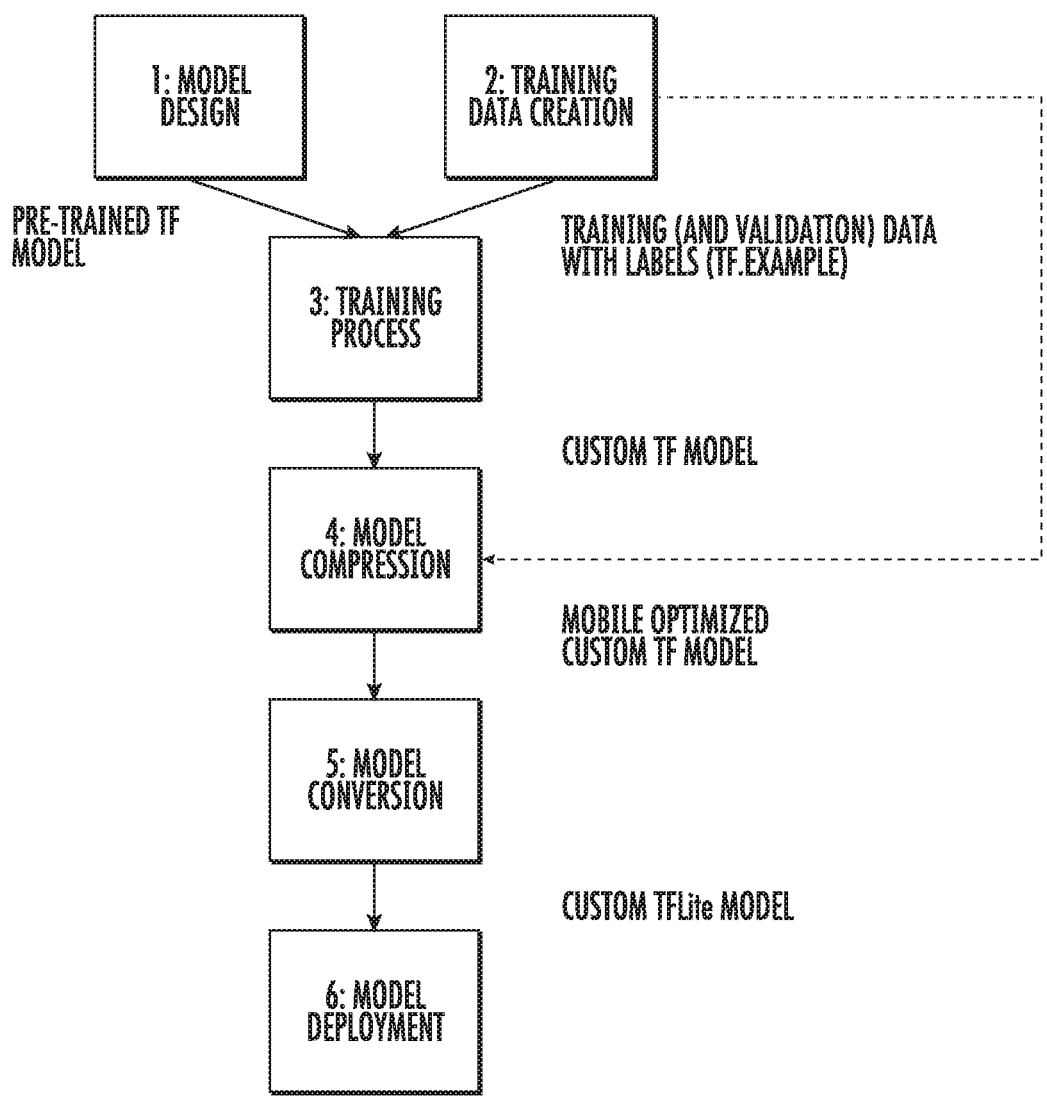
FIG. 6 depicts a flow chart diagram of an example process for generating and deploying machine-learned models according to example embodiments of the present disclosure.
Figure 7:
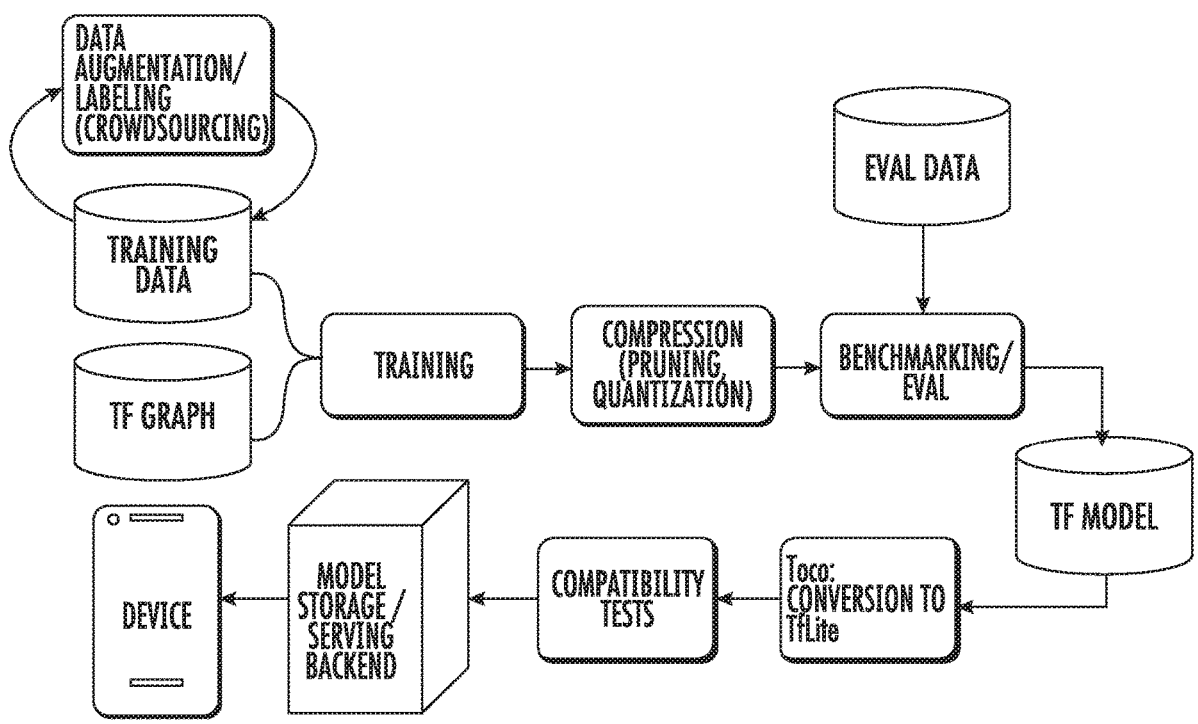
FIG. 7 depicts a workflow diagram of an example process for generating and deploying machine-learned models according to example embodiments of the present disclosure.

FIG. 6 depicts a flow chart diagram of an example process for generating and deploying machine-learned models according to example embodiments of the present disclosure while FIG. 7 depicts a workflow diagram of an example implementation the example process for generating and deploying machine-learned models according to example embodiments of the present disclosure.

In particular, aspects of the present disclosure are directed to an on-device machine intelligence SDK that forms a pail to of a cross-platform third party mobile machine learning platform that operates via APIs. For mobile developers building on-device machine learning features, training a model for mobile applications is still a big pain point for most developers. Furthermore, for a lot of mobile use cases the training workflows are pretty similar. Thus, the present disclosure provides tools to facilitate the whole model training workflow on the cloud.

Step 1: Model selection and design: For the majority of the use cases (e.g., mobile use cases), the training flow starts with a pre-trained model (e.g., Inception v3, MobileNets, etc.). The platform can provide access to a set of pre-trained models that cover some typical computer vision use cases and can guarantee to be converted to a mobile-optimized format. The set of selectable models can also cover other domains or custom models.

Step 2: Training data creation: The platform can assist developers to augment and manage their training data. Data augmentation can include adding more training samples (e.g., via an image search), leveraging crowd-sourcing platforms to provide labels, and introducing/or transformations of existing samples (e.g., add noises, rotations, perturbations, etc.). The platform can also provide data cleaning and visualization tools.

The platform provides a number of data format options, including, as examples: Raw data with labels and/or TF.example. The platform provides a number of model format options, including, as examples, SavedModel and/or Checkpoint.

Step 3: Model training: The training can include refining the pre-trained model (e.g., top layer only or more than top layer only). The training can also include fully automated training from scratch. Training can also optionally be done according to a joint training technique described herein.

Step 4: Model optimization for mobile: Since model size is critical for mobile applications, the platform can provide tools to automatically compress models with evaluation of performance and accuracy. Automatic model optimization can include re-training the model, Where training data may be required.

Step 5: Model conversion for mobile: Once models are obtained that meet the required performance and accuracy, the platform can convert them to a mobile-optimized format ready for deployment. The conversion can include several steps (e.g., model freeze, TOCO conversion, etc. with command line tools. These steps can be streamlined and information about errors can be provided via the platform console. In some implementations, the output models from the compression step can automatically be converted to the mobile format. Depending on the TOCO tool readiness, the models can be enforced to be in some standard architecture such as, for example, through POD compression (e.g., specified output model architecture).

Step 6: Model deployment and management: The application development platform can provide a targeting mechanism for developers to specify which models should be applied for which application versions, device types, and/or user segments. The platform can also provide a compatibility check to make sure models are compatible with the targeted machine learning library runtime. Lastly, the platform can host all the models for the developers and the applications can download/upgrade the models on the fly.

While the platform provides tools to help the complete training flow, the developers can also choose to leverage parts of the flow. For example, if the developers already have the model ready for deployment, they can upload their models and make use of step 6 only. If the developers already have a Tensorflow model for cloud inference, they can upload their Tensorflow models and make use of step 4 and/or 5 as well.

Figure 8:
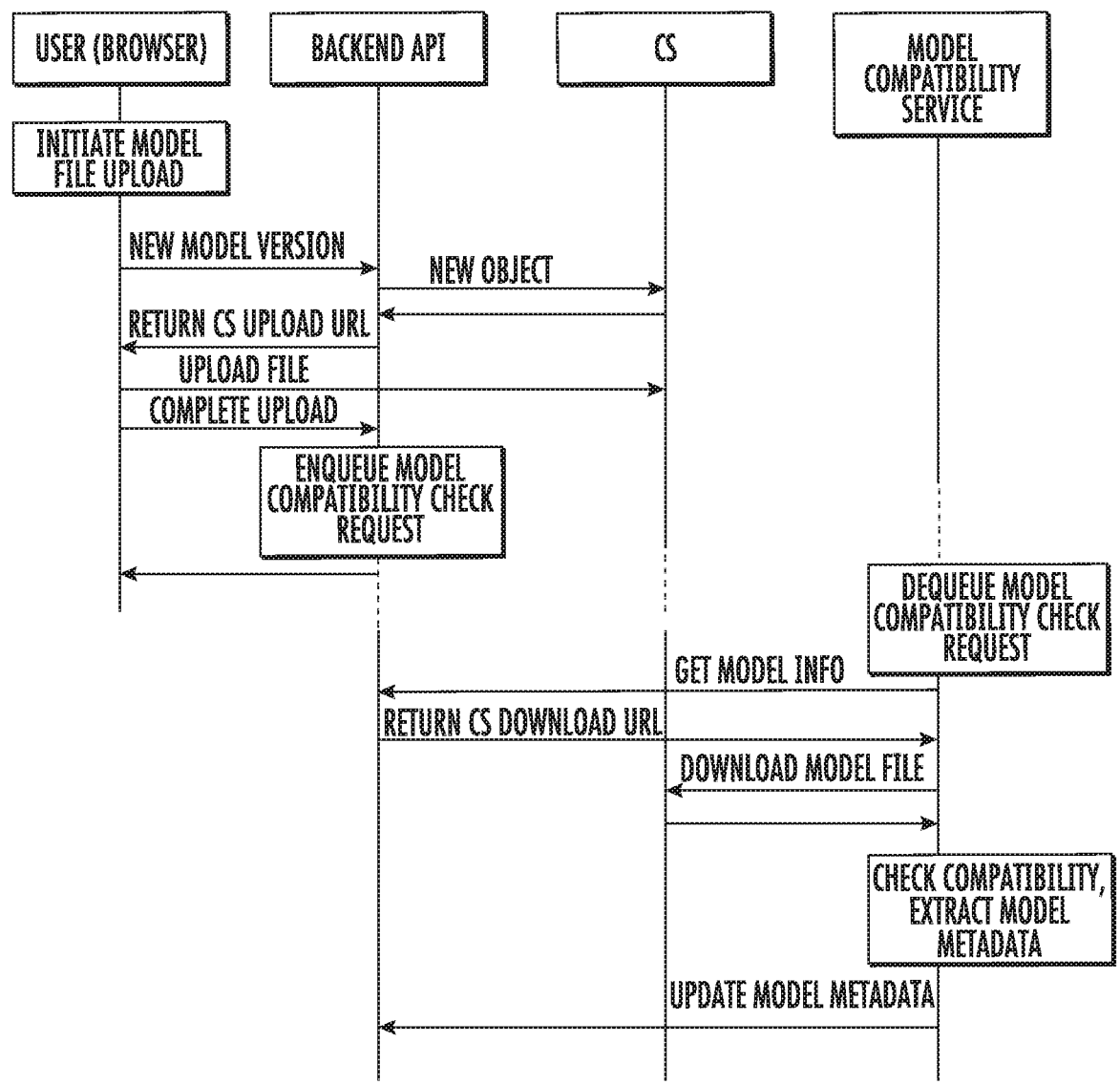
FIG. 8 depicts a swim lane diagram of an example process to upload machine-learned models for distribution according to example embodiments of the present disclosure.

FIG. 8 depicts a swim lane diagram of an example process to upload machine-learned models for distribution according to example embodiments of the present disclosure. As illustrated, a user (developer) can (e.g., via their browser) initiate a model file upload. The platform backend API can create a new object with cloud storage and can return the cloud storage upload URL to the user. The user can upload the file to cloud storage and then inform the platform API when the upload has completed. The backend API can enqueuer a model compatibility check request.

A model compatibility service can dequeue the model compatibility check request and can get model information from the backend API. The API can return the cloud storage download URL. The model compatibility service can download the model file from cloud storage and can check compatibility and extract model metadata. The model compatibility service can update the model metadata with compatibility information.

Thus, in some implementations, model compatibility can be implemented as separate, asynchronous service. When model files are uploaded, a compatibility check request will be added to a database queue. The compatibility check service will then asynchronously perform the check. In some implementations, the model file may not be available for download until the compatibility check is complete.

Figure 9:
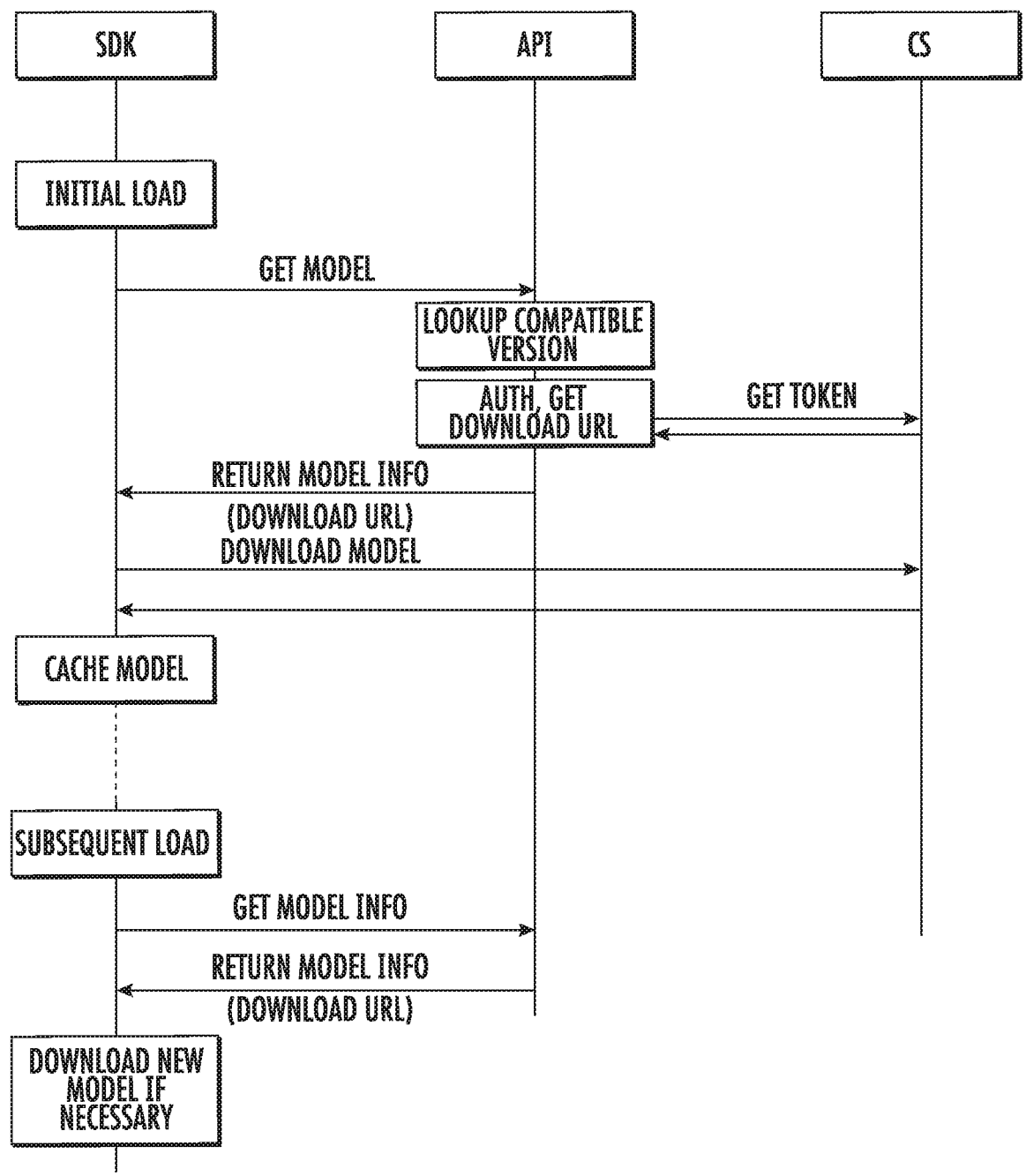
FIG. 9 depicts a swim lane diagram of an example process to download machine-learned models according to example embodiments of the present disclosure.

FIG. 9 depicts a swim lane diagram of an example process to download machine-learned models according to example embodiments of the present disclosure. As illustrated, at an initial load, a machine intelligence SDK can request the model from the API. The API can look up the compatible version, authorize, and then get the download URL from cloud storage. The API can return the model information (e.g., download URL) to the machine intelligence SDK. The machine intelligence SDK can use the URL to download the model from cloud storage and can cache the downloaded model.

At a subsequent load, the SDK can get model information from the API. The API can return model information (including a download URL if appropriate). The SDK can download the new model, if necessary.

Example Machine Intelligence SDKs

FIGS. 10-14 depict example computing systems that include various different example implementations of the machine intelligence SDK. The machine intelligence SDK can be "fat," "partially fat," or "thin."

The application development platform allows developers to either bundle the models together with the SDK or to dynamically download models to the SDK. In one example, the developers can upload their models on the platform console which will get synchronized to and cached on the device. Once on the device, the model is easily accessible to the on-device service via a simple API call.

Expanding on the SDK itself, the SDK may have "on-device backends" for some of these, i.e. calls to other modules (e.g., first party modules) or applications as part of its implementation (as shown in FIGS. 11-14). Alternatively, inclusion of all models and services within a single machine intelligence module as shown in FIG. 10 avoids duplicate machine learning library runtimes; optimizes the implementation, and maintains a single stack (e.g., C/C++ stack) for cross-platform usage.

Figure 10:
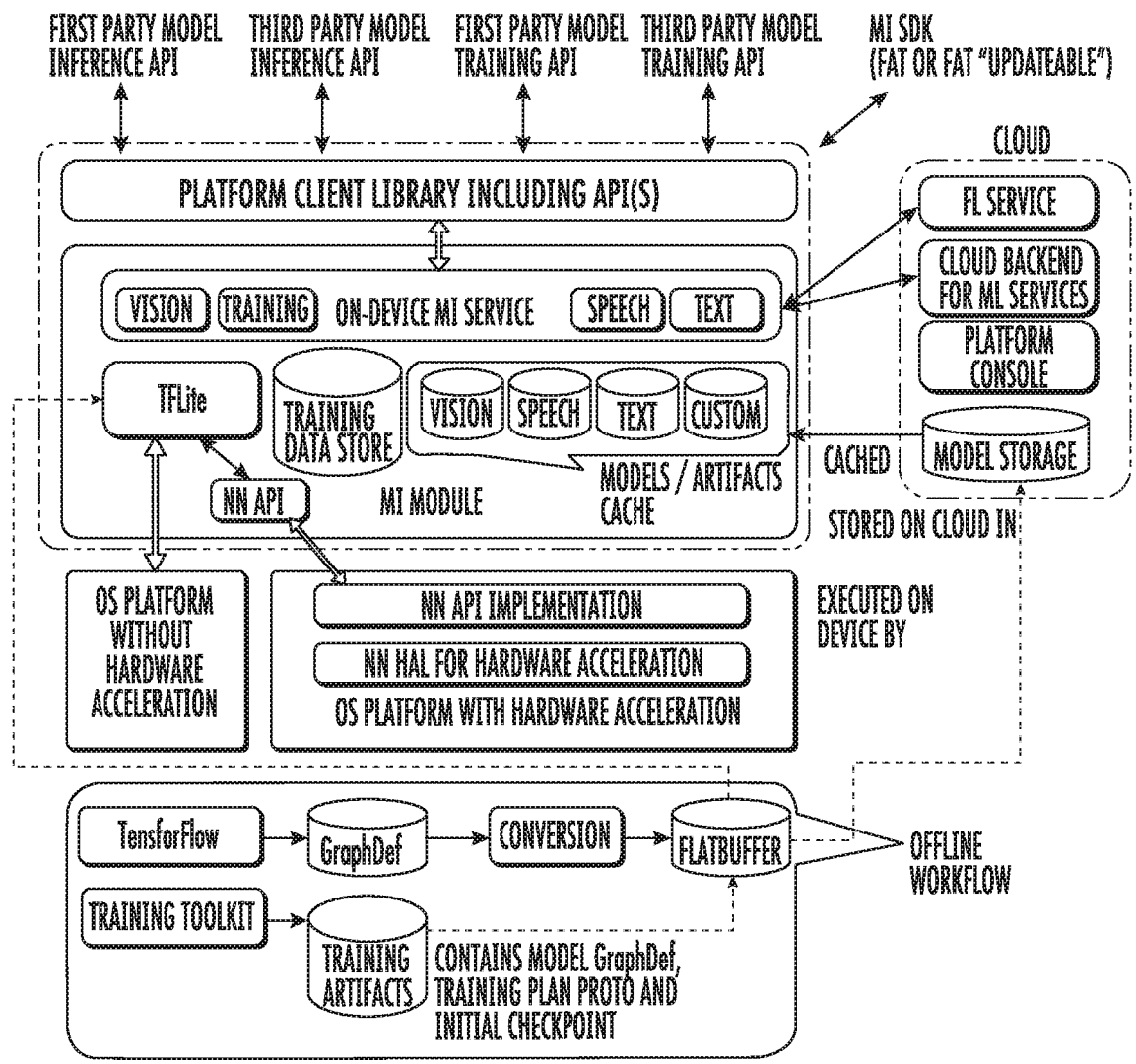
FIG. 10 depicts a block diagram of an example computing system that includes a fat SDK according to example embodiments of the present disclosure.

In particular, FIG. 10 depicts a block diagram of an example computing system that includes a fat SDK according to example embodiments of the present disclosure. In particular, in the fat SDK, all of the machine intelligence models and services (e.g., vision, speech, text, custom, etc.) are unified into one SDK. More specifically, all of the models and a machine learning library/runtime (e.g., TFLite) can be contained within a single machine intelligence module as shown in FIG. 10.

Generally, a "fat" SDK means that all dependencies are pulled into one fat binary and it is statically linked to the application. Typically, the fat SDK does not update any part dynamically via updates. The fat SDK can interact with first party modules or applications however. A fat SDK avoids any machine learning library compatibility issues.

A "fat updateable" SDK is similar to a fat SDK (e.g., one fat binary statically linked to the application) except that aspects of the SDK can be dynamically updated without the full application update. In some implementations, whenever there is a newer version of first party models available on device, they will be dynamically loaded and run in the application's process. This enables quick updating of the machine learning runtime and the models but also introduces the possibility of machine learning library compatibility issues.

A "thin" SDK means that the SDK contains only client libraries and depends on the models being run inside first party support modules or applications. These can optionally still be run within the application's process. The benefit of thin SDKs is that the application package is smaller in size and implementation of the modules can be shared by multiple applications.

Figure 11:
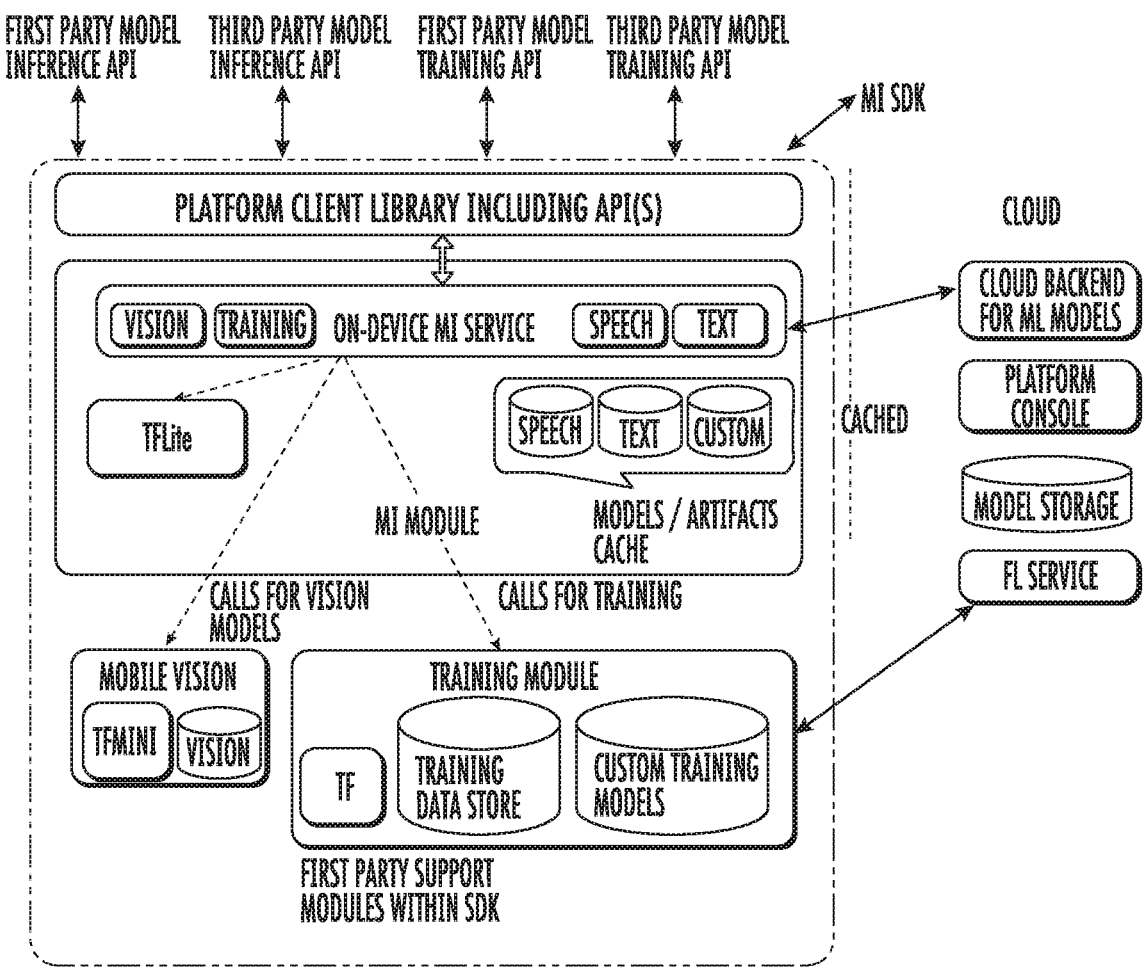
FIG. 11 depicts a block diagram of an example computing system that includes a thin SDK according to example embodiments of the present disclosure.

As an example, FIG. 11 depicts a block diagram of an example computing system that includes a thin SDK according to example embodiments of the present disclosure. As illustrated in FIG. 11, the machine intelligence module may call into other first party modules where applicable to share costs amongst clients. For some of those parts of the SDK, the client library can be in the SDK while the implementation is in a first party module or application.

Thus, various possible arrangements can also enable model management, including decisions regarding bundling in versus dynamic downloads. In particular, in some instances, the models (plus any databases needed for inference) may be quite large (~MB) so the developer can be enabled to decide whether to go for the simplicity of bundling the models, or dynamically download those. For third party models, the developer can select the appropriate choice.

For first party models, the models could be all bundled within the SDK or dynamically downloaded, which may be controlled by the first party. Bundling the models within the SDK provides the following benefits: models available from the application install time; no need to wait for the downloading to happen; less network and power usage; and higher stability, less chance of a compatibility breakage from dynamically downloaded models.

In some implementations, large first party models can be shared amongst two or more applications. The sharing of the models amongst applications can, in one example, be achieved as follows: Make the models part of a first party module (i.e., have a separate updateable module and let it handle models/downloads. The first party module is not part of the 'fat' or 'fat updateable' SDK, but rather is in the 'thin' part of the SDK (i.e., the SDK pulls in only the client library of the module). The first party module can be exposed to the other parts of the SDK via a first party API.

In some implementations, there may be a separate machine learning library runtime for first party models that updates with the first party models and is not used for developer-owned models. This may assist in reducing compatibility issues.

Sharing the models amongst applications provides storage benefits/savings. That is, without sharing, redundant versions of the models will be a large hit on the storage (and application package size if bundled or power/data if they are downloaded) of the device.

In some implementations, the application development platform can distribute SDKs via static frameworks. A static framework can be a single statically-linked library coupled with headers (to be used in both Objective C and Swift) and some extra metadata (e.g., a module map). It is also possible to distribute SDKs as dynamically-loaded libraries.

In some implementations, distribution can occur via CocoaPods, where a CocoaPod is a json file specifying how to fetch the framework. The pod specification can point to a downloadable binary blob or, alternatively, the source code, for example, hosted externally.

A CocoaPod may contain one or more frameworks, although it is typical to only package one framework in a pod. The platform can automate most of the building, testing and deployment pipeline.

In some implementations, if there is already a module that exists in the SDK (e.g., mobile vision), it is easy to form a new SDK which pulls that dependency in as-is (e.g., as opposed to doing more tighter integration).

In some implementations, references can just be made to the symbols of the other library and it can be ensured that the user of the library gets both. With CocoaPods, it is easy to achieve. Some examples may use several dependencies such as Protobuf. The platform's build infrastructure can have provisions to ensure that the dependencies don't get statically linked at build time, preventing duplicate symbol breakages.

Figure 12:
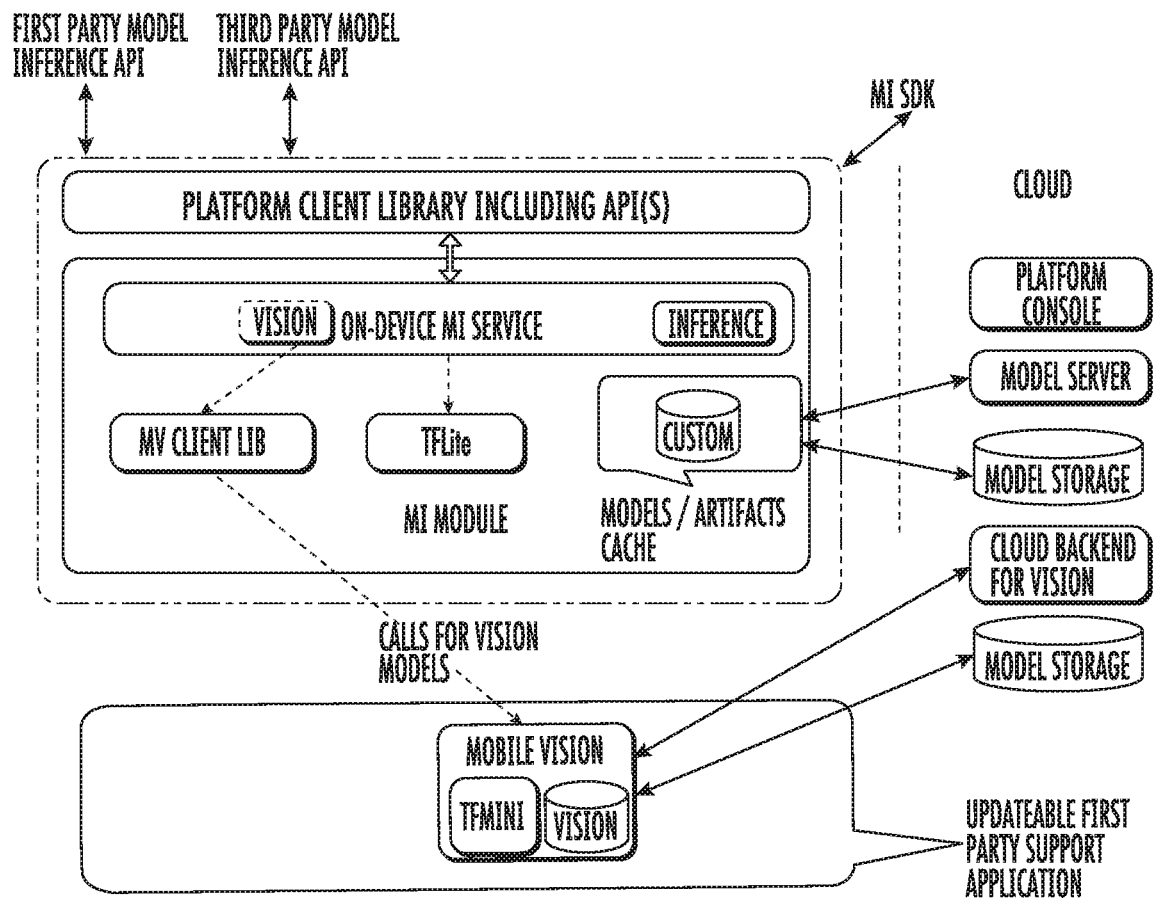
FIG. 12 depicts a block diagram of an example computing system that includes mobile vision models as part of an updatable first party support application according to example embodiments of the present disclosure.

FIG. 12 depicts a block diagram of an example computing system that includes mobile vision models as part of an updatable first party support application according to example embodiments of the present disclosure. In particular, FIG. 12 depicts an architecture where only mobile vision models are provided via APIs to a first party support application while third party models are included in the machine intelligence SDK.

Thus, FIG. 12 shows an example that is part "fat" and part "updateable" SDK, where the custom models and a TFLite runtime are in the fat part and the mobile vision module (along with its tfmini runtime) is in the updateable part.

One example reason for having the mobile vision module as thin updateable (as opposed to fat updateable) is to share the storage space and downloading data of all models amongst all apps that use the SDK. The custom third party models can be updated through the platform console and cloud storage. The platform can provide compatibility tests that can be run from the platform console to help alleviate potential compatibility issues.

As for bundling the models: for mobile vision APIs, the models can be downloaded due to their size. For some third party custom models, developers can make a choice of bundling in the models or later updating the models via dynamic downloading.

Figure 13:
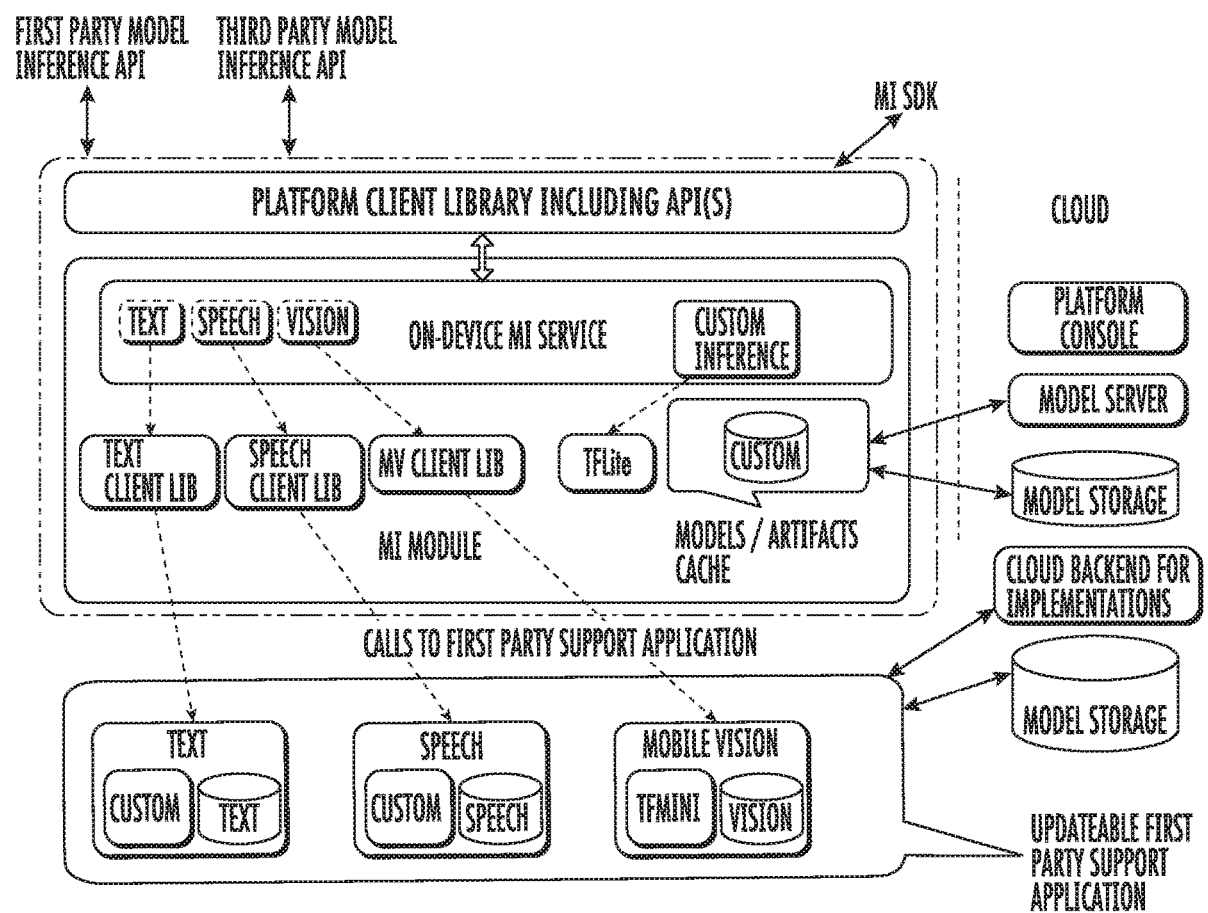
FIG. 13 depicts a block diagram of an example computing system that includes mobile vision, text, and speech models as part of an updatable first party support application according to example embodiments of the present disclosure.

FIG. 13 depicts a block diagram of an example computing system that includes mobile vision, text, and speech models as part of an updatable first party support application according to example embodiments of the present disclosure. That is, relative to FIG. 12, in FIG. 13 more base APIs (e.g., text, speech) are included in the support application, possibly each having their own module structure therein. Redundant common runtimes can optionally be removed.

Figure 14:
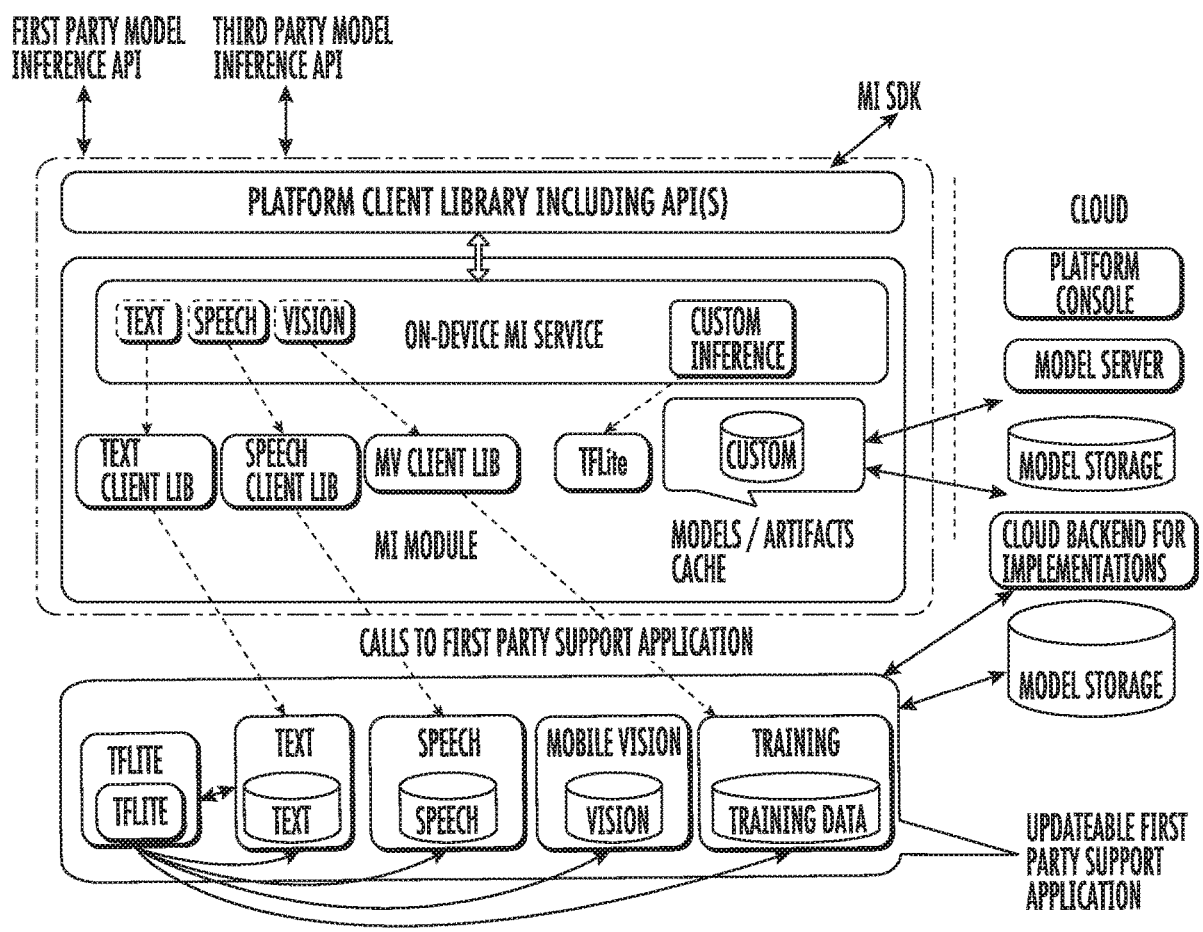
FIG. 14 depicts a block diagram of an example computing system that includes an updatable first party support application that performs both runtime and training according to example embodiments of the present disclosure.

FIG. 14 depicts a block diagram of an example computing system that includes an updatable first party support application that further performs both runtime and training according to example embodiments of the present disclosure. That is, all first party models and modules in the support application use the same runtime in the first party support application, thereby removing redundant runtimes, logging, and downloading of libraries.

The first party support application can also perform training. In other implementations, training can be part of a fat updateable SDK (as opposed to a thin updateable and shared amongst all apps) to provide privacy benefits for application-specific data storage.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

The example SDK and application arrangements illustrated in FIGS. 10-14 are provided as examples only. Many different variations and combinations of these example arrangements can be made according to aspects of the present disclosure.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for jointly learning compact models, the computing system comprising:
one or more processors; and
one or more non-transitory computer-readable media that collectively store instructions that, when executed by the one or more processors, cause the computing system to perform operations, the operations comprising:
obtaining a pre-trained machine-learned model associated with a user;
obtaining one or more user selections associated with the user;
generating a training pipeline comprising one or more user-created schema based on the one or more user selections;
generating a compact model, wherein the compact model comprises an inference speed parameter defined by the user; and
jointly training the compact model and the pre-trained machine-learned model on a set of training data, wherein the compact model has a smaller model size relative to the pre-trained machine-learned model, wherein jointly training the compact model and the pre-trained machine-learned model comprises backpropagating a gradient of a loss function, wherein the gradient is based on a first comparison between an output of the compact model for an input and a ground truth output and a second comparison between the output of the compact model and an output of the pre-trained machine-learned model, wherein jointly training reduces a number of bits used for one or more model weights and one or more activations, and wherein jointly training comprises:
validating the one or more user-created schema of a training pipeline; and
training the compact model and the pre-trained machine-learned model based at least in part on the user-created schema.

2. The computing system of claim 1, wherein jointly training the compact model and the pre-trained machine-learned model comprises backpropagating the gradient of the loss function, wherein the loss function comprises a combined loss function that comprises:
a first loss term that describes a trainer prediction error;
a second loss term that describes a student simulation error; and
a third loss term that describes a student prediction error.

3. The computing system of claim 2, wherein the first loss term describes a distance between the output of the pre-trained machine-learned model and a ground truth.

4. The computing system of claim 2, wherein the second loss term describes a distance between the output of the pre-trained machine-learned model and the output of the compact model.

5. The computing system of claim 2, wherein the combined loss function comprises first, second, and third weighting values that respectively weight the first, second, and third loss terms relative to each other.

6. The computing system of claim 1, wherein the operations further comprise:
receiving a user input that selects one of a number of available compact model architectures;
wherein generating the compact model comprises generating the compact model that has the compact model architecture selected by the user input.

7. The computing system of claim 1, wherein the operations further comprise:
receiving a user input that specifies one or both of a desired model size or a desired inference speed;
wherein generating the compact model comprises generating the compact model that exhibits one or more both of the desired model size or the desired inference speed.

8. The computing system of claim 1, wherein the operations further comprise:
receiving a user input that specifies a type of input data;
wherein generating the compact model comprises generating the compact model that is configured to receive and process the type of input data specified by the user input.

9. The computing system of claim 1, wherein the operations further comprise:
receiving a user input that specifies a prediction task;
wherein generating the compact model comprises generating the compact model that is configured to perform the prediction task.

10. The computing system of claim 1, wherein:
generating the compact model comprises generating a plurality of compact models that have different architectures; and
jointly training the compact model and the pre-trained machine-learned model comprises jointly training the plurality of compact models and the pre-trained machine-learned model.

11. The computing system of claim 10, wherein the operations further comprise, after jointly training the plurality of compact models, deploying the plurality of compact models respectively to a plurality of different user groups that have different user device capabilities.

12. The computing system of claim 1, wherein the compact model comprises a projection neural network.

13. The computing system of claim 1, wherein the pre-trained machine-learned model comprises a checkpoint from a production model deployed for cloud-based inference.

14. The computing system of claim 1, wherein the pre-trained machine-learned model is selected by the user from a set of provided pre-trained models.

15. The computing system of claim 1, wherein the operations further comprise:
determining one or more particular weights of the compact model that are low-scoring weights; and
removing the one or more particular weights of the compact model.

16. A computer-implemented method, comprising:
obtaining, by one or more computing devices, a pre-trained machine-learned model associated with a user;
receiving, by the one or more computing devices, user input that describes one or more desired model characteristics, the one or more desired model characteristics comprising one or more of: a desired model size, a desired inference speed, a type of input data, or a prediction type;
generating, by the one or more computing devices, a training pipeline comprising one or more user-created schema based on the user input, wherein the user input comprises one or more selections associated with the user;
automatically generating, by the one or more computing devices, a compact model specification based at least in part on the user input, wherein the compact model comprises an inference speed parameter defined by the user; and jointly training, by the one or more computing devices, a compact model that has the compact model specification and the pre-trained machine-learned model on a set of training data, wherein the compact model has a smaller model size relative to the pre-trained machine-learned model, and wherein the compact model exhibits the one or more desired model characteristics, wherein jointly training the compact model and the pre-trained machine-learned model comprises backpropagating a gradient of a loss function, wherein the gradient is based on a first comparison between an output of the compact model for an input and a ground truth output and a second comparison between the output of the compact model and an output of the pre-trained machine-learned model, wherein jointly training reduces a number of bits used for one or more model weights and one or more activations, and wherein jointly training comprises:
validating the one or more user-created schema of a training pipeline; and
training the compact model and the pre-trained machine-learned model based at least in part on the user-created schema.

17. The computer-implemented method of claim 16, wherein jointly training, by the one or more computing devices, the compact model that has the compact model specification and the pre-trained machine-learned model comprises backpropagating, by the one or more computing devices, a gradient of a combined loss function that comprises:
- a first loss term that describes a trainer prediction error exhibited between an output the pre-trained machine-learned model and a ground truth;
- a second loss term that describes a student simulation error exhibited between the output of the pre-trained machine-learned model and an output of the compact model; and
- a third loss term that describes a student prediction error exhibited between the output of the compact model and the ground truth.

18. One or more non-transitory computer-readable media that collectively store instructions that, when executed by one or more processors, cause the one or more processors to perform operations, the operations comprising:
- obtaining a pre-trained machine-learned model associated with a user;
- receiving user input that describes one or more desired model characteristics, the one or more desired model characteristics comprising one or more of: a desired model size, a desired inference speed, a type of input data, or a prediction type;
  - generating, by the one or more computing devices, a training pipeline comprising one or more user-created schema based on the user input, wherein the user input comprises one or more selections associated with the user;
- automatically generating a compact model specification based at least in part on the user input, wherein the compact model comprises an inference speed parameter defined by the user; and
- jointly training a compact model that has the compact model specification and the pre-trained machine-learned model on a set of training data, wherein the compact model has a smaller model size relative to the pre-trained machine-learned model, and wherein the compact model exhibits the one or more desired model characteristics, wherein jointly training the compact model and the pre-trained machine-learned model comprises backpropagating a gradient of a loss function, wherein the gradient is based on a first comparison between an output of the compact model for an input and a ground truth output and a second comparison between the output of the compact model and an output of the pre-trained machine-learned model, wherein jointly training reduces a number of bits used for one or more model weights and one or more activations, and wherein jointly training comprises:
- validating the one or more user-created schema of a training pipeline; and
- training the compact model and the pre-trained machine-learned model based at least in part on the user-created schema.

\* \* \* \* \*